United States Patent
Gross et al.

(10) Patent No.: US 12,404,204 B2
(45) Date of Patent: *Sep. 2, 2025

(54) GLASSES WITH MODIFIED YOUNG'S MODULUS PROFILE

(71) Applicant: CORNING INCORPORATED, Corning, NY (US)

(72) Inventors: Timothy Michael Gross, Painted Post, NY (US); Adam Robert Sarafian, Corning, NY (US); Jingshi Wu, Painted Post, NY (US); Zheming Zheng, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 961 days.

This patent is subject to a terminal disclaimer.

(21) Appl. No.: 17/610,839

(22) PCT Filed: May 12, 2020

(86) PCT No.: PCT/US2020/032419
§ 371 (c)(1),
(2) Date: Nov. 12, 2021

(87) PCT Pub. No.: WO2020/231959
PCT Pub. Date: Nov. 19, 2020

(65) Prior Publication Data
US 2022/0204386 A1    Jun. 30, 2022

Related U.S. Application Data

(60) Provisional application No. 62/848,770, filed on May 16, 2019.

(51) Int. Cl.
*B32B 15/04*    (2006.01)
*B32B 17/06*    (2006.01)
(Continued)

(52) U.S. Cl.
CPC .............. *C03C 3/097* (2013.01); *C03C 4/00* (2013.01); *C03C 21/007* (2013.01); *C03C 2201/32* (2013.01)

(58) Field of Classification Search
CPC ..................................................... C03C 3/097
(Continued)

(56) References Cited

U.S. PATENT DOCUMENTS 2,273,778 A    2/1942  Berthold
2,377,062 A    5/1945  Frederick et al.
(Continued)

FOREIGN PATENT DOCUMENTS

BE    382736 A    9/1931
CN    104411648 A    3/2015
(Continued)

OTHER PUBLICATIONS

Bartholomew; "Water in Glass"; Treatise on Materials Science and Technology; vol. 22, Glass III Eda. M. Tomozawa and Rh Doremus. (Academic Press 1982) 75-127.
(Continued)

*Primary Examiner* — Lauren R Colgan
(74) *Attorney, Agent, or Firm* — Russell S. Magaziner

(57) ABSTRACT

Glass-based articles that include a reduced Young's modulus layer extending from a surface of the glass-based article to a depth of layer and an optional compressive stress layer extending from a surface of the glass-based article to a depth of compression are formed by exposing glass-based substrates to water vapor containing environments. The methods of forming the glass-based articles may include elevated pressures and/or multiple exposures to water vapor containing environments. The glass-based articles may be utilized in foldable or flexible electronic devices.

20 Claims, 7 Drawing Sheets

(51) Int. Cl.
    *C03C 3/097*    (2006.01)
    *C03C 4/00*    (2006.01)
    *C03C 21/00*    (2006.01)

(58) Field of Classification Search
    USPC .................................... 428/410, 426, 428
    See application file for complete search history.

(56) References Cited

U.S. PATENT DOCUMENTS

| | | | |
|---|---|---|---|
| 3,275,470 A | 9/1966 | Charles | |
| 3,395,998 A | 8/1968 | Olcott | |
| 3,485,647 A | 12/1969 | Harrington | |
| 3,498,802 A | 3/1970 | Bickford et al. | |
| 3,498,803 A | 3/1970 | Stookey | |
| 3,653,864 A | 4/1972 | Rothermel et al. | |
| 3,756,798 A | 9/1973 | Ernsberger | |
| 3,811,853 A | 5/1974 | Bartholomew et al. | |
| 3,843,344 A | 10/1974 | Galey | |
| 3,912,481 A | 10/1975 | Bartholomew et al. | |
| 3,915,720 A | 10/1975 | Tarcza | |
| 3,948,629 A * | 4/1976 | Bartholomew | C03C 23/00 |
| | | | 501/12 |
| 4,042,405 A | 8/1977 | Krohn et al. | |
| 4,053,679 A | 10/1977 | Rinehart | |
| 4,098,596 A | 7/1978 | Wu | |
| 4,099,978 A | 7/1978 | Bartholomew et al. | |
| 4,102,693 A | 7/1978 | Owen et al. | |
| 4,133,665 A * | 1/1979 | Bartholomew | C03C 23/00 |
| | | | 65/30.12 |
| 4,175,942 A | 11/1979 | Lipp | |
| 4,201,561 A | 5/1980 | Pierson et al. | |
| 4,214,886 A | 7/1980 | Shay et al. | |
| 5,475,528 A | 12/1995 | LaBorde | |
| 5,698,019 A | 12/1997 | Frank et al. | |
| 6,200,137 B1 | 3/2001 | Hoeland et al. | |
| 6,376,402 B1 | 4/2002 | Pannhorst et al. | |
| 7,534,734 B2 | 5/2009 | Ellison | |
| 7,666,511 B2 | 2/2010 | Ellison et al. | |
| 7,833,919 B2 | 11/2010 | Danielson et al. | |
| 7,846,857 B2 | 12/2010 | Hoeland et al. | |
| 7,851,394 B2 | 12/2010 | Ellison | |
| 7,891,212 B2 | 2/2011 | Hideki | |
| 7,937,967 B2 | 5/2011 | Minazawa | |
| 8,075,999 B2 | 12/2011 | Barefoot et al. | |
| 8,158,543 B2 | 4/2012 | Dejneka et al. | |
| 8,187,987 B2 * | 5/2012 | Amin | C03C 3/093 |
| | | | 501/72 |
| 8,232,218 B2 | 7/2012 | Dejneka et al. | |
| 8,586,492 B2 | 11/2013 | Barefoot et al. | |
| 8,598,056 B2 | 12/2013 | Ellison et al. | |
| 8,759,238 B2 | 6/2014 | Chapman et al. | |
| 8,802,581 B2 | 8/2014 | Dejneka et al. | |
| 8,854,623 B2 | 10/2014 | Fontaine et al. | |
| 8,969,226 B2 | 3/2015 | Dejneka et al. | |
| 9,156,724 B2 | 10/2015 | Gross | |
| 9,162,919 B2 | 10/2015 | Ellison et al. | |
| 9,321,677 B2 | 4/2016 | Chang et al. | |
| 9,346,703 B2 | 5/2016 | Bookbinder et al. | |
| 9,527,767 B2 | 12/2016 | Ellison et al. | |
| 9,567,254 B2 | 2/2017 | Amin et al. | |
| 9,622,483 B2 | 4/2017 | Bookbinder et al. | |
| 9,682,885 B2 | 6/2017 | Gross | |
| 9,783,453 B2 | 10/2017 | Gross | |
| 9,802,857 B2 | 10/2017 | Bowden et al. | |
| 9,815,733 B2 | 11/2017 | Dejneka et al. | |
| 9,890,073 B2 | 2/2018 | Kase | |
| 9,969,644 B2 | 5/2018 | Gross et al. | |
| 9,975,803 B2 | 5/2018 | Gross | |
| 10,017,412 B2 | 7/2018 | Bookbinder et al. | |
| 10,611,675 B2 | 4/2020 | Beall et al. | |
| 11,104,602 B2 * | 8/2021 | Gross | B32B 27/365 |
| 11,214,510 B2 * | 1/2022 | Gross | C03C 3/105 |
| 11,339,084 B2 * | 5/2022 | Gross | H05K 5/0017 |
| 11,370,696 B2 * | 6/2022 | Gross | C03C 21/007 |
| 11,377,386 B2 * | 7/2022 | Gross | C03C 3/083 |
| 11,643,356 B2 * | 5/2023 | Gross | C03C 3/105 |
| | | | 501/63 |
| 11,760,685 B2 * | 9/2023 | Gross | C03C 3/105 |
| | | | 501/63 |
| 12,054,423 B2 * | 8/2024 | Gross | C03C 3/083 |
| 2004/0107733 A1 | 6/2004 | Yashizawa | |
| 2005/0223746 A1 | 10/2005 | Yoshizawa et al. | |
| 2009/0018007 A1 | 1/2009 | Siebers et al. | |
| 2009/0098998 A1 | 4/2009 | Minazawa | |
| 2009/0129061 A1 | 5/2009 | Fechner et al. | |
| 2009/0325776 A1 | 12/2009 | Murata | |
| 2010/0035745 A1 * | 2/2010 | Murata | C03C 3/093 |
| | | | 501/68 |
| 2010/0215993 A1 | 8/2010 | Yagi et al. | |
| 2011/0014475 A1 * | 1/2011 | Murata | C03C 3/091 |
| | | | 65/30.14 |
| 2011/0092353 A1 | 4/2011 | Amin et al. | |
| 2011/0294648 A1 | 12/2011 | Chapman et al. | |
| 2012/0108414 A1 * | 5/2012 | Ruedinger | C03C 10/0027 |
| | | | 65/33.9 |
| 2012/0135226 A1 | 5/2012 | Bookbinder et al. | |
| 2012/0277085 A1 * | 11/2012 | Bookbinder | C03C 21/002 |
| | | | 65/30.12 |
| 2013/0115422 A1 | 5/2013 | Murata | |
| 2013/0122284 A1 | 5/2013 | Gross | |
| 2013/0122313 A1 | 5/2013 | Gross | |
| 2013/0136909 A1 | 5/2013 | Mauro et al. | |
| 2013/0186139 A1 | 7/2013 | Tanii | |
| 2013/0224492 A1 * | 8/2013 | Bookbinder | C03C 21/002 |
| | | | 65/30.14 |
| 2013/0288001 A1 | 10/2013 | Murata et al. | |
| 2013/0295353 A1 | 11/2013 | Drake et al. | |
| 2013/0316162 A1 | 11/2013 | Murata et al. | |
| 2013/0330599 A1 | 12/2013 | Kroll et al. | |
| 2013/0343166 A1 | 12/2013 | Matsumoto et al. | |
| 2014/0154661 A1 | 6/2014 | Bookbinder et al. | |
| 2014/0170380 A1 | 6/2014 | Murata et al. | |
| 2014/0335331 A1 | 11/2014 | Ellison et al. | |
| 2015/0064474 A1 | 3/2015 | Dejneka et al. | |
| 2015/0079398 A1 | 3/2015 | Amin et al. | |
| 2015/0140336 A1 | 5/2015 | Sakagami et al. | |
| 2015/0147576 A1 * | 5/2015 | Bookbinder | A01N 59/16 |
| | | | 65/30.14 |
| 2015/0230476 A1 | 8/2015 | Bookbinder et al. | |
| 2015/0239776 A1 | 8/2015 | Amin et al. | |
| 2015/0259244 A1 | 9/2015 | Amin et al. | |
| 2015/0299035 A1 | 10/2015 | Kuksenkov | |
| 2015/0329413 A1 | 11/2015 | Beall et al. | |
| 2016/0122239 A1 | 5/2016 | Amin et al. | |
| 2016/0137549 A1 | 5/2016 | Meiss et al. | |
| 2016/0145152 A1 | 5/2016 | Martin et al. | |
| 2016/0225396 A1 | 8/2016 | Shimojima | |
| 2017/0008797 A1 | 1/2017 | Wagner | |
| 2017/0022093 A1 | 1/2017 | Demartino et al. | |
| 2017/0217827 A1 | 8/2017 | Aitken et al. | |
| 2017/0283304 A1 | 10/2017 | Yamazaki et al. | |
| 2017/0297308 A1 | 10/2017 | Golyatin et al. | |
| 2017/0361574 A1 | 12/2017 | Kiczenski et al. | |
| 2018/0265398 A1 | 9/2018 | Yamazaki et al. | |
| 2018/0282201 A1 | 10/2018 | Hancock et al. | |
| 2018/0317496 A1 | 11/2018 | Bookbinder et al. | |
| 2019/0152838 A1 * | 5/2019 | Gross | C03C 3/083 |
| 2019/0195510 A1 | 6/2019 | Weiss et al. | |
| 2019/0367408 A1 | 12/2019 | Harris et al. | |
| 2020/0156994 A1 | 5/2020 | Li et al. | |
| 2020/0156996 A1 | 5/2020 | Gross et al. | |
| 2020/0156997 A1 | 5/2020 | Gross et al. | |
| 2020/0308047 A1 | 10/2020 | Glacki et al. | |
| 2021/0214269 A1 | 7/2021 | Yuki | |

FOREIGN PATENT DOCUMENTS

| | | |
|---|---|---|
| CN | 105143134 A | 12/2015 |
| CN | 105765499 A | 7/2016 |
| CN | 108341595 A | 7/2018 |
| DE | 4026814 A1 | 2/1992 |
| DE | 102016109085 A1 | 11/2017 |

(56) References Cited

FOREIGN PATENT DOCUMENTS

| | | |
|---|---|---|
| DE | 202018102537 U1 | 5/2018 |
| EP | 0690030 A1 | 1/1996 |
| EP | 0885856 A2 | 12/1998 |
| EP | 1888474 A1 | 2/2008 |
| GB | 1454335 A | 11/1976 |
| JP | 06-092674 B2 | 11/1994 |
| JP | 08-290936 A | 11/1996 |
| JP | 2001-226138 A | 8/2001 |
| JP | 2016-183091 A | 10/2016 |
| JP | 6474041 B2 | 2/2019 |
| SU | 1100252 A1 | 6/1984 |
| WO | 2006/131473 A1 | 12/2006 |
| WO | 2007/013538 A1 | 2/2007 |
| WO | 2009/055745 A1 | 4/2009 |
| WO | 2014/201318 A1 | 12/2014 |
| WO | 2015/156206 A1 | 10/2015 |
| WO | 2016/094282 A1 | 6/2016 |
| WO | 2016/104454 A1 | 6/2016 |
| WO | 2018/136388 A1 | 7/2018 |
| WO | 2019/055745 A1 | 3/2019 |
| WO | 2019/099814 A1 | 5/2019 |
| WO | 2020/102127 A2 | 5/2020 |
| WO | 2020/102147 A2 | 5/2020 |

OTHER PUBLICATIONS

Enss, "Investigations on the Dependency of the Relative Susceptibility of Glass to Attack by Water on its Chemical Composition", Glastech Ber. vol. 5, No. 11, p. 509, 1927.

Fett et al. "Effect of water on the inert strength of silica glass: role of water penetration", J Am Ceram Soc 95(12) 2012. pp. 3847-3853.

Fett et al. "Estimation of ion exchange layers for soda-lime-silicate glass from curvature measurements", J Mater Sci 41, 2006. pp. 5006-5010.

Fett et al. "Stresses in ion-exchange layers of soda-soda-lime-silicate glass", Fatigue Fract Engng Mater Struct 28, 2005. pp. 507-514.

Fett et al., "Interpretation of effects at the static fatigue limit of soda-lime-silicate glass" Engineering Fracture Mechanics, vol. 72, 2774-2791 (2005).

Gehrke et al; "Fatigue Limit and Crack Arrest in Alkali-Containing Silicate Glasses"; Journal of Materials Science; 26 (1991) pp. 5445-5455.

Haider et al., "The Diffusion of Wale( Into Some Simple Silicate and Aluminosilicate Glasses Al Temperatures Near the Transformation Range", Glass Technology vol. 11 No.6, Dec. 1970.

Haider et al., "The Diffusion of 'Water' Into Some Simple Silicate and Aluminosilicate Glasses At Temperatures Near the Transformation Range", Glass Technology vol. 11 No. 6, Dec. 1970, 6 pages.

International Search Report and Writien Opinion of the European International Searching Authority; PCT/US2019/060817; Mailed Apr. 8, 2020; 12 pgs.

International Search Report and Written Opinion of the International Searching Authority; PCT/US20/032422; dated Jul. 27, 2020; 13 pages; European Patent Office.

International Search Report and Written Opinion of the International Searching Authority; PCT/US2018/061500; Dated Apr. 8, 2019, 9 pages; European Patent Office.

Invitation to Pay Additional Fees; PCT/US2019/060819; Dated Apr. 8, 2020; 12 Pages; European International Searching Authority.

Invitation to Pay Additional Fees; PCT/US2019/060847; Dated May 6, 2020; 13 Pages; European International Searching Authority.

Kuznetsova et al., "Effect of the Composition of Complex Silicate Glasses on Water and Gas Leaching", Fizika i khimiya Stekla, vol. 15, No. 2, pp. 245-251, 1989.

Lanford et al. "Hydration of soda-lime glass", Journal of Non-Crystalline Solids 33, 1979. pp. 249-266.

Leko, "Influence of Composition and Temperature on the Absorption Band Intensity for Water in Alkali Silicate Glasses", Glass Physics and Chemistry, vol. 23, No. 3, pp. 214-224, 1997.

Li and Tomozawa, "Mechanical strength increase of abraded silica glass by high pressure water vapor treatment", Journal of Non-Crystalline Solids 168 (1994) 287-292.

Liu et al. "Nanocrystal formation and photoluminescence in the $Yb^{3+}/Er^{3+}$ codoped phosphosilicate glasses", Journal of Non-Crystalline Solids, 2014, vol. 383, p. 141-145.

Sarkisov et al, "Effect of the liquation structure on the chemical stability of glasses of the $SiO_2$—$CaO$—$Al_2O_3$—$K_2O$—$P_2O_5$ System", Phsyics and Chemistry of Glass 14(3) 1988, pp. 445-451.

Scholze, "Gases and Water in Glass", Part Two; Institute for Glass and Ceramics, University of Berlin, Lectures on Glass and Technology Rensselaer Polytechnic Institute, Troy, N.Y, Mar. 30-Apr. 1, 1966, pp. 622-628.

Spierings, "The near Infared Absorption of Water in Glasses", Physics and Chemistry of Glasses, vol. 23, No. 4, pp. 129-134, Aug. 1982.

Steklo et al., "Molar Volumes and Refractive Indices of Water-Containing Aluminosilicate Glasses", Steklo, No. 2, pp. 65, 1978.

Takata et al., "Effect of Water Content on Mechanical Properties of $Na_2O$—$SiO_2$ Glasses," Communications of the American Ceramic Society, 1982, pp. C156-C157.

Tsong, et al., "Evidence for Interdiffusion of Hydronium and Alkali Ions in Leached Glasses", Applied Physics Letters, vol. 39, (1981), pp. 669-670.

Wiederhorn et al. "Effect of water penetration on the strength and toughness of silica glass", J Am Ceram Soc 94(S1) 2011, pp. S196-S203.

Wiederhorn et al. "Volume expansion caused by water penetration into silica glass", J Am Ceram Soc 98(1) 2015, pp. 78-87.

Wiederhorn et al. "Water penetration—its effect on the strength and toughness of silica glass", Metallurgical and Materials Transactions A, 44A, Mar. 2013. pp. 1165-1174.

Yoko et al, "Hydration of silicate, phosphate and borate glasses in an autoclave", Riv. Staz. Sper. Vetro, vol. 14, No. 5, pp. 99-194, 1984.

Yoko et al., "Hydration of Silicate Glasses by Water Vapor at High Temperature", Glastech. Ber. vol. 56K, pt 1, pp. 650-655, 1983.

* cited by examiner

GLASSES WITH MODIFIED YOUNG'S MODULUS PROFILE

This application claims the benefit of priority under 35 U.S.C. § 371 of International Application No. PCT/US2020/032419, filed on May 12, 2020, which claims the benefit of priority of U.S. Provisional Application Ser. No. 62/848,770 filed on May 16, 2019, the content of which is relied upon and incorporated herein by reference in its entirety.

BACKGROUND

Field

This disclosure relates to glass-based articles modified by steam treatment, glass compositions utilized to form the glass-based articles, and methods of steam treatment to modify the glass-based articles.

Technical Background

Portable electronic devices, such as, smartphones, tablets, and wearable devices (such as, for example, watches and fitness trackers) continue to get smaller and more complex. As such, materials that are conventionally used on at least one external surface of such portable electronic devices also continue to get more complex. For instance, as portable electronic devices get smaller and thinner to meet consumer demand, the display covers and housings used in these portable electronic devices also get smaller and thinner, resulting in higher performance requirements for the materials used to form these components. Additionally, new designs for these portable electronic devices, such as foldable devices, require materials with different performance capabilities.

Accordingly, a need exists for materials that exhibit different performance capabilities, such as resistance to damage in foldable devices, along with lower cost and ease of manufacture for use in portable electronic devices.

SUMMARY

In aspect (1), a glass-based article is provided. The glass-based article comprises: a reduced Young's modulus layer extending from a surface of the glass-based article to a depth of layer; and a compressive stress layer extending from a surface of the glass-based article to a depth of compression. The compressive stress layer comprises a compressive stress greater than or equal to 10 MPa, and the reduced Young's modulus layer comprises a Young's modulus at a depth of 500 nm from the surface that is less than a bulk Young's modulus of a glass having a composition equivalent to the composition at the center of the glass-based article.

In aspect (2), the glass-based article of aspect (1) is provided, wherein the center of the glass-based article comprises greater than or equal to 55 mol % $SiO_2$.

In aspect (3), the glass-based article of aspect (1) or (2) is provided, wherein the bulk Young's modulus of a glass having a composition equivalent to the composition at the center of the glass-based article is less than or equal to 60 GPa.

In aspect (4), the glass-based article of any of aspects (1) to (3) is provided, wherein the depth of compression is greater than or equal to 5 μm.

In aspect (5), the glass-based article of any of aspects (1) to (4) is provided, wherein the depth of compression is greater than or equal to 20 μm.

In aspect (6), the glass-based article of any of aspects (1) to (5) is provided, wherein the compressive layer comprises a compressive stress of greater than or equal to 100 MPa.

In aspect (7), the glass-based article of any of aspects (1) to (6) is provided, wherein the Young's modulus at a depth of 500 nm from the surface is less than or equal to 95% of the bulk Young's modulus of a glass having a composition equivalent to the composition at the center of the glass-based article.

In aspect (8), the glass-based article of any of aspects (1) to (7) is provided, wherein the Young's modulus at a depth of 500 nm from the surface is less than or equal to 90% of the bulk Young's modulus of a glass having a composition equivalent to the composition at the center of the glass-based article.

In aspect (9), the glass-based article of any of aspects (1) to (8) is provided, wherein the glass-based article has a thickness of less than or equal to 200 μm.

In aspect (10), the glass-based article of any of aspects (1) to (9) is provided, wherein the center of the glass-based article comprises:
greater than or equal to 55 mol % to less than or equal to 70 mol % $SiO_2$;
greater than or equal to 3 mol % to less than or equal to 17 mol % $Al_2O_3$;
greater than or equal to 0.25 mol % to less than or equal to 15 mol % $P_2O_5$; and
greater than or equal to 5 mol % to less than or equal to 20 mol % $K_2O$.

In aspect (11), the glass-based article of any of aspects (1) to (10) is provided, wherein the center of the glass-based article comprises:
greater than or equal to 0 mol % to less than or equal to 15 mol % $B_2O_3$;
greater than or equal to 0 mol % to less than or equal to 10 mol % $Na_2O$;
greater than or equal to 0 mol % to less than or equal to 5 mol % ZnO; and
greater than or equal to 0 mol % to less than or equal to 0.5 mol % $SnO_2$.

In aspect (12), the glass-based article of any of aspects (1) to (11) is provided, wherein the center of the glass-based article comprises:
greater than or equal to 0 mol % to less than or equal to 4 mol % $Li_2O$; and
greater than or equal to 0 mol % to less than or equal to 5 mol % MgO.

In aspect (13), the glass-based article of any of aspects (1) to (12) is provided, wherein the glass-based article is substantially free of $Li_2O$ and $Na_2O$.

In aspect (14), the glass-based article of any of aspects (1) to (13) is provided, wherein the glass-based article has a stress intensity of less than or equal to 0.4 MPa $\sqrt{m}$ for a bend radius of 3.3 mm, flaw depth of 500 nm, and geometry factor of 0.73.

In aspect (15), the glass-based article of any of aspects (1) to (14) is provided, further comprising a hydrogen-containing layer extending from the surface of the glass-based article to a hydrogen depth of layer, wherein a hydrogen concentration of the hydrogen-containing layer decreases from a maximum hydrogen concentration to the hydrogen depth of layer.

In aspect (16), a glass-based article is provided. The glass-based article comprises: a reduced Young's modulus layer extending from a surface of the glass-based article to a depth of layer; and a thickness of less than or equal to 200 µm. The reduced Young's modulus layer comprises a Young's modulus at a depth of 500 nm from the surface that is less than a bulk Young's modulus of a glass having a composition equivalent to the composition at the center of the glass-based article. The Young's modulus at a depth of 500 nm from the surface is less than or equal to 55 GPa. The bulk Young's modulus of a glass having a composition equivalent to the composition at the center of the glass-based article is less than or equal to 60 GPa.

In aspect (17), the glass-based article of aspect (16) is provided, wherein the glass-based article has a thickness of less than or equal to 100 µm.

In aspect (18), the glass-based article of aspect (16) or (17) is provided, further comprising a compressive stress layer extending from a surface of the glass-based article to a depth of compression, wherein the compressive stress layer comprises a compressive stress greater than or equal to 10 MPa.

In aspect (19), the glass-based article of aspect (18) is provided, wherein the depth of compression is greater than or equal to 5 µm.

In aspect (20), the glass-based article of any of aspects (16) to (19) is provided, wherein the center of the glass-based article comprises:
greater than or equal to 55 mol % to less than or equal to 70 mol % $SiO_2$;
greater than or equal to 3 mol % to less than or equal to 17 mol % $Al_2O_3$;
greater than or equal to 0.25 mol % to less than or equal to 15 mol % $P_2O_5$; and
greater than or equal to 5 mol % to less than or equal to 20 mol % $K_2O$.

In aspect (21), the glass-based article of any of aspects (16) to (20) is provided, wherein the center of the glass-based article comprises:
greater than or equal to 0 mol % to less than or equal to 15 mol % $B_2O_3$;
greater than or equal to 0 mol % to less than or equal to 10 mol % $Na_2O$;
greater than or equal to 0 mol % to less than or equal to 5 mol % ZnO; and
greater than or equal to 0 mol % to less than or equal to 0.5 mol % $SnO_2$.

In aspect (22), the glass-based article of any of aspects (16) to (21) is provided, wherein the center of the glass-based article comprises:
greater than or equal to 0 mol % to less than or equal to 4 mol % $Li_2O$; and
greater than or equal to 0 mol % to less than or equal to 5 mol % MgO.

In aspect (23), the glass-based article of any of aspects (16) to (22) is provided, wherein the glass-based article is substantially free of $Li_2O$ and $Na_2O$.

In aspect (24), the glass-based article of any of aspects (16) to (23) is provided, wherein the Young's modulus at a depth of 500 nm from the surface is less than or equal to 95% of the bulk Young's modulus of a glass having a composition equivalent to the composition at the center of the glass-based article.

In aspect (25), the glass-based article of any of aspects (16) to (24) is provided, wherein the Young's modulus at a depth of 500 nm from the surface is less than or equal to 90% of the bulk Young's modulus of a glass having a composition equivalent to the composition at the center of the glass-based article.

In aspect (26), the glass-based article of any of aspects (16) to (25) is provided, wherein the glass-based article has a stress intensity of less than or equal to 0.4 MPa √m for a bend radius of 3.3 mm, a flaw depth of 500 nm, and a geometry factor of 0.73.

In aspect (27), the glass-based article of any of aspects (16) to (26) is provided, further comprising a hydrogen-containing layer extending from the surface of the glass-based article to a hydrogen depth of layer, wherein a hydrogen concentration of the hydrogen-containing layer decreases from a maximum hydrogen concentration to the hydrogen depth of layer.

In aspect (28), a consumer electronic product is provided. The consumer electronic product comprises: a housing comprising a front surface, a back surface and side surfaces; electrical components at least partially within the housing, the electrical components comprising at least a controller, a memory, and a display, the display at or adjacent the front surface of the housing; and a cover substrate disposed over the display. At least a portion of at least one of the housing and the cover substrate comprises the glass-based article of any of aspects (1) to (27).

In aspect (29), a glass is provided. The glass comprises:
greater than or equal to 55 mol % to less than or equal to 70 mol % $SiO_2$;
greater than or equal to 3 mol % to less than or equal to 17 mol % $Al_2O_3$;
greater than or equal to 0.25 mol % to less than or equal to 15 mol % $P_2O_5$; and
greater than or equal to 5 mol % to less than or equal to 20 mol % $K_2O$.

In aspect (30), the glass of aspect (29) is provided, further comprising:
greater than or equal to 0 mol % to less than or equal to 15 mol % $B_2O_3$;
greater than or equal to 0 mol % to less than or equal to 10 mol % $Na_2O$;
greater than or equal to 0 mol % to less than or equal to 5 mol % ZnO; and
greater than or equal to 0 mol % to less than or equal to 0.5 mol % $SnO_2$.

In aspect (31), the glass of aspect (29) or (30) is provided, wherein the center of the glass-based article comprises:
greater than or equal to 0 mol % to less than or equal to 4 mol % $Li_2O$; and
greater than or equal to 0 mol % to less than or equal to 5 mol % MgO.

In aspect (32), the glass of any of aspects (29) to (31) is provided, wherein the glass is substantially free of $Li_2O$ and $Na_2O$.

In aspect (33), the glass of any of aspects (29) to (32) is provided, wherein the glass has a bulk Young's modulus of less than or equal to 60 GPa.

In aspect (34), the glass of any of aspects (29) to (33) is provided, wherein the glass has a bulk Young's modulus of less than or equal to 55 GPa.

In aspect (35), a method is provided. The method comprises: exposing a glass-based substrate to an environment with a pressure greater than or equal to 0.1 MPa, a water partial pressure of greater than or equal to 0.05 MPa, and a temperature of greater than or equal to 85° C. to form a glass-based article with a reduced Young's modulus layer extending from a surface of the glass-based article to a depth of layer. The Young's modulus at a depth of 500 nm from the surface of the glass-based article is less than a bulk Young's modulus of the glass-based substrate. The environment may have a water partial pressure of greater than or equal to 0.075 MPa, and a temperature of greater than or equal to 200° C.

In aspect (36), the method of aspect (35) is provided, wherein the Young's modulus at a depth of 500 nm from the surface of the glass-based article is less than a Young's modulus at a depth of 500 nm from the surface of the glass-based substrate.

In aspect (37), the method of aspect (35) or (36) is provided, wherein the Young's modulus at a depth of 500 nm from the surface of the glass-based article is less than or equal to 95% of the Young's modulus at a depth of 500 nm from the surface of the glass-based substrate.

In aspect (38), the method of any of aspects (35) to (37) is provided, wherein the bulk Young's modulus of the glass-based substrate is less than or equal to 60 GPa.

In aspect (39), the method of any of aspects (35) to (38) is provided, wherein the bulk Young's modulus of the glass-based substrate is less than or equal to 55 GPa.

In aspect (40), the method of any of aspects (35) to (39) is provided, wherein the glass-based article further comprises a compressive stress layer extending from a surface of the glass-based article to a depth of compression, wherein the compressive stress layer comprises a compressive stress greater than or equal to 10 MPa.

In aspect (41), the method of aspect (40) is provided, wherein the depth of compression is greater than or equal to 5 μm.

In aspect (42), the method of any of aspects (35) to (41) is provided, wherein the glass-based substrate comprises:
  greater than or equal to 55 mol % to less than or equal to 70 mol % $SiO_2$;
  greater than or equal to 3 mol % to less than or equal to 17 mol % $Al_2O_3$;
  greater than or equal to 0.25 mol % to less than or equal to 15 mol % $P_2O_5$; and
  greater than or equal to 5 mol % to less than or equal to 20 mol % $K_2O$.

In aspect (43), the method of any of aspects (35) to (42) is provided, wherein the glass-based substrate comprises:
  greater than or equal to 0 mol % to less than or equal to 15 mol % $B_2O_3$;
  greater than or equal to 0 mol % to less than or equal to 10 mol % $Na_2O$;
  greater than or equal to 0 mol % to less than or equal to 5 mol % ZnO; and
  greater than or equal to 0 mol % to less than or equal to 0.5 mol % $SnO_2$.

In aspect (44), the method of any of aspects (35) to (43) is provided, wherein the center of the glass-based article comprises:
  greater than or equal to 0 mol % to less than or equal to 4 mol % $Li_2O$; and
  greater than or equal to 0 mol % to less than or equal to 5 mol % MgO.

In aspect (45), the method of any of aspects (35) to (44) is provided, wherein the glass-based substrate is substantially free of $Li_2O$ and $Na_2O$.

In aspect (46), the method of any of aspects (35) to (45) is provided, wherein the glass-based article has a thickness of less than or equal to 200 μm.

In aspect (47), the method of any of aspects (35) to (46) is provided, wherein the relative humidity is 100%.

In aspect (48), the method of any of aspects (35) to (47) is provided, wherein the exposing extends for a time period of greater than or equal to 2 hours.

In aspect (49), the method of any of aspects (35) to (48) is provided, wherein the glass-based article is not subjected to an ion-exchange treatment with an alkali ion source.

These and other aspects, advantages, and salient features will become apparent from the following detailed description, the accompanying drawings, and the appended claims.

DETAILED DESCRIPTION

Figure 1:
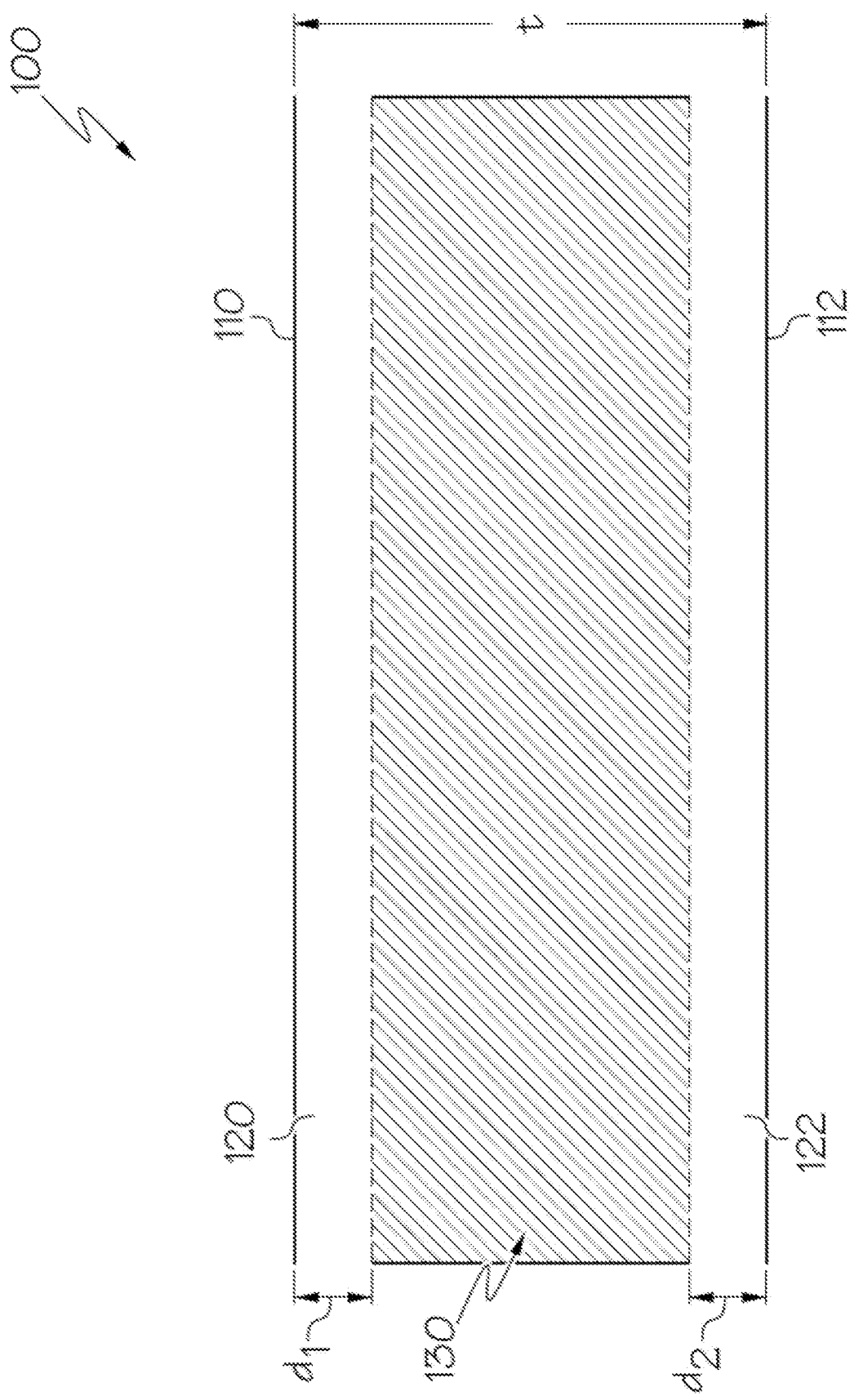
FIG. 1 is a representation of a cross-section of a glass-based article according to an embodiment.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. Unless otherwise specified, a range of values, when recited, includes both the upper and lower limits of the range as well as any sub-ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the term "glass-based" is used in its broadest sense to include any objects made wholly or partly of glass, including glass ceramics (which include a crystalline phase and a residual amorphous glass phase). Unless otherwise specified, all compositions of the glasses described herein are expressed in terms of mole percent (mol %), and the constituents are provided on an oxide basis. Unless otherwise specified, all temperatures are expressed in terms of degrees Celsius (° C.).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. For example, a glass that is "substantially free of $K_2O$" is one in which $K_2O$ is not actively added or batched into the glass but may be present in very small amounts as a contaminant, such as in amounts of less than about 0.1 mol %. As utilized herein, when the term "about" is used to modify a value, the exact value is also disclosed. For example, the term "greater than about 10 mol %" also discloses "greater than or equal to 10 mol %."

Reference will now be made in detail to various embodiments, examples of which are illustrated in the accompanying examples and drawings.

The glass-based articles disclosed herein are formed by steam treating a glass-based substrate to produce a reduced Young's modulus layer extending from a surface of the article to a depth of layer (DOL). The reduced Young's modulus layer includes a Young's modulus that increases from a minimum Young's modulus to the depth of layer. In some embodiments, the minimum Young's modulus may be located at the surface of the glass-based article. As used herein, depth of layer (DOL) refers to the first depth below the surface of the glass-based article where the Young's modulus is equal to the bulk Young's modulus of a glass having the composition of the center of the glass-based article. This definition accounts for the bulk Young's modulus of the glass-based substrate prior to treatment, such that the depth of layer refers to the depth of the reduced Young's modulus layer produced by the treatment process.

The glass-based articles disclosed herein may additionally include a compressive stress layer extending from surface of the article to a depth of compression (DOC). The compressive stress layer includes a stress that decreases from a maximum stress to the depth of compression. In some embodiments, the maximum compressive stress may be located at the surface of the glass-based article. As used herein, depth of compression (DOC) means the depth at which the stress in the glass-based article changes from compressive to tensile. Thus, the glass-based article also contains a tensile stress region having a maximum central tension (CT), such that the forces within the glass-based article are balanced.

The glass-based articles further include a hydrogen-containing layer extending from a surface of the article to a hydrogen depth of layer. The hydrogen-containing layer includes a hydrogen concentration that decreases from a maximum hydrogen concentration of the glass-based article to the hydrogen depth of layer. In some embodiments, the maximum hydrogen concentration may be located at the surface of the glass-based article.

The glass-based articles may be formed by exposing glass-based substrates to environments containing water vapor, thereby allowing hydrogen species to penetrate the glass-based substrates and form the glass-based articles having a reduced Young's modulus layer, a hydrogen-containing layer, and/or a compressive stress layer. As utilized herein, hydrogen species includes molecular water, hydroxyl, hydrogen ions, and hydronium. The composition of the glass-based substrates may be selected to promote the interdiffusion of hydrogen species into the glass. As utilized herein, the term "glass-based substrate" refers to the precursor prior to exposure to a water vapor containing environment for the formation of a glass-based article that includes a reduced Young's modulus layer, a hydrogen-containing layer, and/or a compressive stress layer. Similarly, the term "glass-based article" refers to the post exposure article that includes a reduced Young's modulus layer, a hydrogen-containing layer, and/or a compressive stress layer.

The glass-based articles disclosed herein may exhibit a compressive stress layer without undergoing conventional ion exchange, thermal tempering, or lamination treatments. Ion exchange processes produce significant waste in the form of expended molten salt baths that require costly disposal, and also are applicable to only some glass compositions. Additionally, conventional ion exchange treatments may produce a layer with increased Young's modulus at the surface, which may not be desired for flexible applications. Thermal tempering requires thick glass specimens as a practical matter, as thermal tempering of thin sheets utilizes small air gap quenching processes which results in sheet scratching damage that reduces performance and yield. Additionally, it is difficult to achieve uniform compressive stress across surface and edge regions when thermal tempering thin glass sheets. Laminate processes result in exposed tensile stress regions when large sheets are cut to usable sizes, which is undesirable.

The water vapor treatment utilized to form the glass-based articles allows for reduced waste and lower cost when compared to ion exchange treatments as molten salts are not utilized. The water vapor treatment is also capable of strengthening thin (<2 mm) low-cost glass that would not be suitable for thermal tempering at such thicknesses. Additionally, the water vapor treatment may be performed at the part level, avoiding the undesirable exposed tensile stress regions associated with laminate processes. In sum, the glass-based articles disclosed herein may be produced with a low thickness and at a low cost.

A representative cross-section of a glass-based article 100 according to some embodiments is depicted in FIG. 1. The glass-based article 100 has a thickness t that extends between a first surface 110 and a second surface 112. A first reduced Young's modulus layer 120 extends from the first surface 110 to a first depth of layer, where the first depth of layer has a depth $d_1$ measured from the first surface 110 into the glass-based article 100. A second reduced Young's modulus layer 122 extends from the second surface 112 to a second depth of layer, where the second depth of layer has a depth $d_2$ measured from the second surface 112 into the glass-based article 100. A bulk Young's modulus region 130 is present between the first depth of layer and the second depth of layer, where the Young's modulus is substantially unaffected by the water vapor treatment. In embodiments, the first depth of layer $d_1$ may be substantially equivalent or equivalent to the second depth of layer $d_2$.

Figure 4:
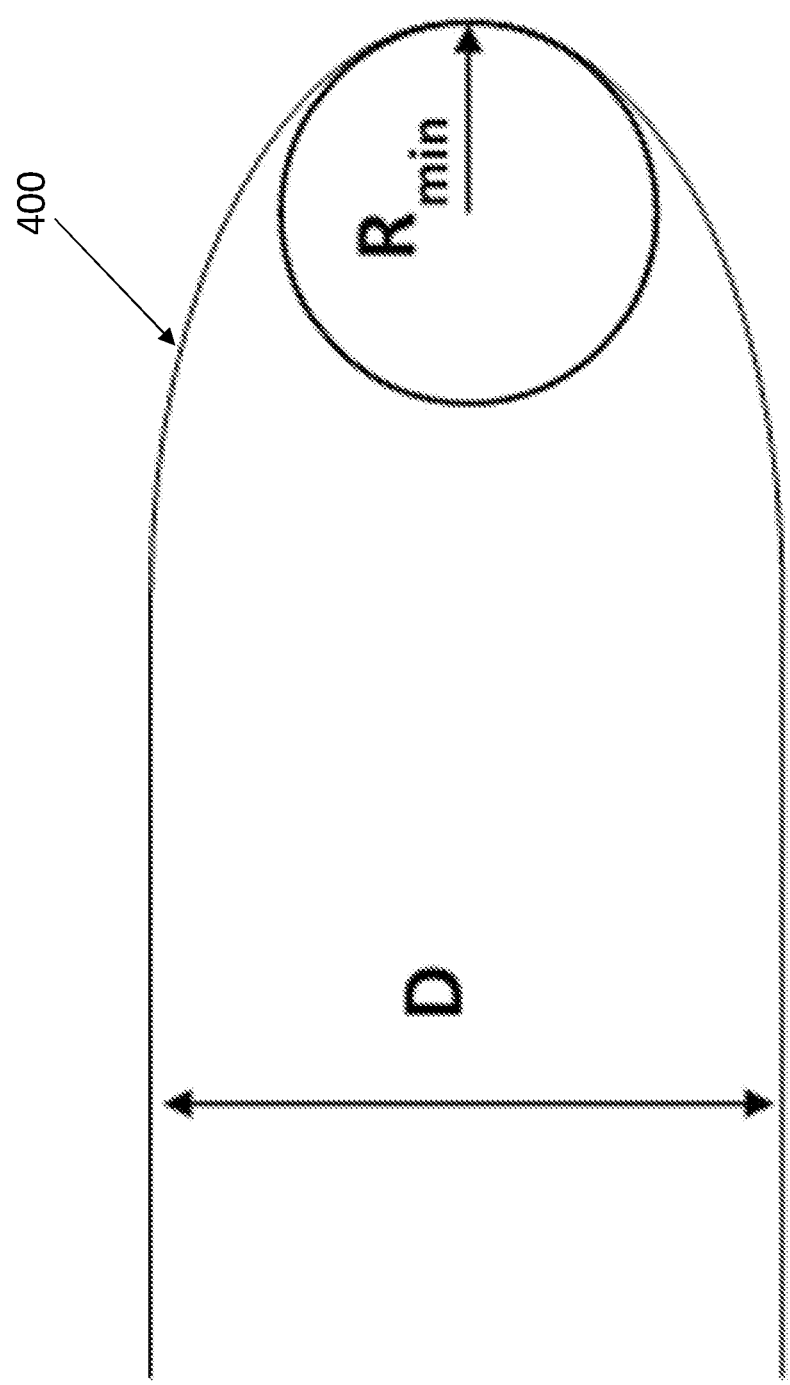
FIG. 4 is a diagram of glass-based article bent to a minimum bend radius at a plate separation distance.

The reduced Young's modulus layer of the glass-based articles reduces the bend-induced stress at the surface and in the near-surface region of the glass-based articles when subjected to bending. The bend-induced stress may be calculated based on the bend radius and the properties of the glass-based article. For example, the maximum bend induced stress ($\sigma_{Bend\ max}$) may be calculated for given bend radius according to the formula:

$$\sigma_{Bend\ max} = \frac{E}{1-v^2} \frac{t}{2} \frac{1}{R}$$

where E is the bulk Young's modulus, v is the Poisson's ratio, t is the thickness, and R is the bend radius. A schematic of a bent glass-based article in a two-point bend test is shown in FIG. 4, where the glass-based article 400 is bent to a minimum bend radius $R_{min}$ and D is the parallel plate separation. The minimum bend radius may be related to the parallel plate separation distance by the following equation:

$$D - t = 2.396 \cdot R_{min}$$

For the purposes herein, the minimum bend radius is utilized as the bend radius when calculating the bend-induced stress, as the minimum bend radius corresponds to the maximum bend-induced stress.

For a bent plate with a constant Young's modulus, the convex surface of the bent plate will have the maximum bend-induced tensile stress and the concave surface will have the maximum bend-induced compressive stress. In such a bent plate, the stress change is linear from one surface to the other, and the zero bend-induced stress point falls at the neutral axis at the half-thickness depth.

To accurately calculate the bend-induced stress profiles of the treated glass-based articles herein that include a reduced Young's modulus layer, the stress in the near-surface region must be modified to account for the reduced Young's modulus. The correct stress at a given depth may be calculated with the following formula:

$$\sigma_{x\ Bend\ corr} = \frac{\sigma_{x\ Bend\ Bulk} + E_x}{E_{Bulk}}$$

where $\sigma_{x\ Bend\ corr}$ is the corrected bend-induced stress at depth x, $\sigma_{x\ Bend\ Bulk}$ is the bend-induced stress calculated at depth x based on the bulk Young's modulus, $E_x$ is the Young's modulus at depth x, and $E_{Bulk}$ is the bulk Young's modulus. It is not necessary to correct the bend-induced stress at depths greater than the depth of layer, as the Young's modulus at these depths is equivalent to the bulk Young's modulus.

The bend-induced stress profile calculated based on the above formulas includes regions of reduced stress in the near-surface region, which correlate to the reduced Young's modulus layer. The bend-induced stress profile may be combined with a compressive stress profile of the glass-based article to produce a complete stress profile of the bent glass-based article. The complete stress profile may then be utilized to calculate a stress intensity at a crack tip in the glass-based article. In situations where the stress intensity is less than the static fatigue limit for the glass, the crack will not grow. As utilized herein, the stress intensity refers to the mode I stress intensity ($K_I$), which refers to crack opening stress. The stress intensity may be calculated according to the following formula:

$$K_I = \Omega \cdot \sigma_x \cdot \sqrt{\pi a}$$

where $\Omega$ is a shape factor for the crack geometry, $\sigma_x$ is the total stress at depth x, and a is the crack depth. The total stress at depth x is the sum of the bend-induced stress and the compressive stress at depth x. To err on the side of caution, the stress at the crack tip ($\sigma_{500\ nm}$ for a crack with a depth of 500 nm) is employed when calculating the stress intensity. The shape factor utilized herein is 0.73. If the stress intensity is less than the static fatigue limit for the glass-based article, it is expected that the crack will not grow. Resistance to crack growth provides the glass-based article with resistance to fracture. Potassium containing glass compositions of the type described herein typically have a static fatigue limit of less than or equal to 0.4 MPa√m. For this reason, the glass-based articles described herein may have a stress intensity of less than 0.4 MPa√m, such as a stress intensity of less than 0.4 MPa√m for a bend radius of 3.3 mm and a crack depth of 500 nm.

The glass-based articles exhibit a surface Young's modulus that is less than the bulk Young's modulus of the glass-based substrate utilized to form the article. In some embodiments, the glass-based articles may have a surface Young's modulus of less than or equal to 55 GPa, such as less than or equal to 54 GPa, less than or equal to 53 GPa, less than or equal to 52 GPa, less than or equal to 51 GPa, less than or equal to 50 GPa, less than or equal to 49 GPa, less than or equal to 48 GPa, less than or equal to 47 GPa, less than or equal to 46 GPa, less than or equal to 45 GPa, less than or equal to 44 GPa, less than or equal to 43 GPa, less than or equal to 42 GPa, less than or equal to 41 GPa, less than or equal to 40 GPa, less than or equal to 39 GPa, or less. As utilized herein, the "surface Young's modulus" is measured at the surface (depth of 0 μm) by a nanoindentation method, with a Berkovich diamond indenter tip. Similarly, the Young's modulus at a specified depth is measured at the specified depth by a nanoindentation method, with a Berkovich diamond indenter tip. By way of illustration, the Young's modulus at 500 μm is measured at a depth of 500 μm from the surface by a nanoindentation method, with a Berkovich diamond indenter tip. In some embodiments, the glass-based articles may have a Young's modulus a depth of 500 nm of less than or equal to 55 GPa, such as less than or equal to 54 GPa, less than or equal to 53 GPa, less than or equal to 52 GPa, less than or equal to 51 GPa, less than or equal to 50 GPa, less than or equal to 49 GPa, less than or equal to 48 GPa, less than or equal to 47 GPa, less than or equal to 46 GPa, less than or equal to 45 GPa, less than or equal to 44 GPa, less than or equal to 43 GPa, less than or equal to 42 GPa, less than or equal to 41 GPa, less than or equal to 40 GPa, less than or equal to 39 GPa, or less.

The degree to which the Young's modulus of the reduced Young's modulus layer is reduced may be characterized by comparing the Young's modulus at a depth of 500 nm from the surface of the glass-based article to the bulk Young's modulus of the glass-based substrate utilized to form the glass-based article. In some embodiments, the glass-based articles may have a Young's modulus at a depth of 500 nm of less than or equal to 95% of the bulk Young's modulus of the glass-based substrate utilized to form the glass-based article, such as less than or equal to 94%, less than or equal to 93%, less than or equal to 92%, less than or equal to 91%, less than or equal to 90%, less than or equal to 89%, less than or equal to 88%, less than or equal to 87%, less than or equal to 86%, less than or equal to 85%, less than or equal to 84%, less than or equal to 83%, less than or equal to 82%, less than or equal to 81%, less than or equal to 80%, less than or equal to 79%, less than or equal to 78%, less than or equal to 77%, less than or equal to 76%, less than or equal to 75%, less than or equal to 74%, less than or equal to 73%, or less. Due to the substantially constant Young's modulus throughout the glass-based substrates, the bulk Young's modulus of the untreated glass-based substrates is expected to be substantially equivalent or equivalent to the Young's modulus at a depth of 500 nm from the surface of the untreated glass-based substrates. Additionally, the bulk Young's modulus of the glass-based substrates is expected to be substantially equivalent or equivalent to the bulk Young's modulus of a glass having a composition equivalent to the composition at the center of the glass-based articles.

The degree to which the Young's modulus of the reduced Young's modulus layer is reduced may also be characterized by the reduction in the Young's modulus at a depth of 500 nm from the surface of the glass-based article due to the water vapor treatment. The reduction is calculated by comparison to the Young's modulus at a depth of 500 nm from the surface of the glass-based substrate utilized to form the glass-based article. In some embodiments, the glass-based articles may have a Young's modulus at a depth of 500 nm reduction of greater than or equal to 9%, such as greater than or 10%, greater than or 11%, greater than or 12%, greater than or 13%, greater than or 14%, greater than or 15%, greater than or 16%, greater than or 17%, greater than or 18%, greater than or 19%, greater than or 20%, greater than or 21%, greater than or 22%, greater than or 23%, or more.

The reduced Young's modulus layer of the glass-based articles may have a depth of layer (DOL) greater than 5 μm. In some embodiments, the depth of layer may be greater than or equal to 1 μm, such as greater than or equal to 1.5 μm, greater than or equal to 2 μm, greater than or equal to 2.5 μm, greater than or equal to 3 μm, greater than or equal to 3.5 μm, greater than or equal to 4 μm, greater than or equal to 4.5 μm, greater than or equal to 5 μm, greater than or equal to 5.5 μm, greater than or equal to 6 μm, greater than or equal to 6.5 μm, greater than or equal to 7 μm, greater than or equal to 7.5 μm, greater than or equal to 8 μm, greater than or equal to 8.5 μm, greater than or equal to 9 μm, greater than or equal to 9.5 μm, greater than or equal to 10 μm, or more. In some embodiments, the hydrogen depth of layer may be from greater than 1 μm to less than or equal to 10 μm, such as from greater than or equal to 1.5 μm to less than or equal to 9.5 μm, from greater than or equal to 2 μm to less than or equal to 9 μm, from greater than or equal to 2.5 μm to less than or equal to 8.5 μm, from greater than or equal to 3 μm to less than or equal to 8 μm, from greater than or equal to 3.5 μm to less than or equal to 7.5 μm, from greater than or equal to 4 μm to less than or equal to 7 μm, from greater than or equal to 4.5 μm to less than or equal to 6.5 μm, from greater than or equal to 5 μm to less than or equal to 6 μm, 5.5 μm, or any sub-ranges formed by any of these endpoints.

The reduced Young's modulus layer of the glass-based articles may have a depth of layer (DOL) greater than 0.001t, wherein t is the thickness of the glass-based article. In some embodiments, the depth of layer may be greater than or equal to 0.002t, such as greater than or equal to 0.003t, greater than or equal to 0.004t, greater than or equal to 0.005t, or more. In some embodiments, the DOL may be from greater than 0.001t to less than or equal to 0.010t, such as from greater than or equal to 0.002t to less than or equal to 0.009t, from greater than or equal to 0.003t to less than or equal to 0.008t, from greater than or equal to 0.004t to less than or equal to 0.007t, from greater than or equal to 0.005t to less than or equal to 0.006t, 0.005t, or any sub-ranges formed by any of these endpoints.

The glass-based articles may include a one or more compressive stress layers extending from a surface of the glass-based article to a depth of compression. In some embodiments, the glass-based articles may include two compressive stress layers, in an arrangement similar to the arrangement of reduced Young's modulus layers shown in FIG. 1. In such embodiments, a central tension region is present between a first depth of compression and a second depth of compression, associated with a first compressive stress layer and a second compressive stress layer, respectively. In embodiments, the first depth of compression may be substantially equivalent or equivalent to the second depth of compression.

The combination of a compressive stress layer with the reduced Young's modulus layer of the glass-based articles described herein provides additional advantages for flexible and/or foldable applications. As discussed above, the reduced Young's modulus layer increases the resistance of the glass-based articles to fracture when bent by reducing the bend-induced stress in the near-surface region. Compressive stress layers are also known to provide increased resistance to fracture in glass-based articles. However, conventional ion exchange techniques utilized to impart a compressive stress layer also increase the Young's modulus in the near-surface region subjected to ion exchange. Such an increase in Young's modulus undesirably increases the bend-induced stress in the near-surface region. For this reason, the combination of a compressive stress layer with a reduced Young's modulus layer provided by the glass-based articles described herein are especially suited for flexible and/or foldable applications where the glass-based article will be subjected to bend-induced stresses. Stated differently, the glass-based articles described herein provide increased fracture resistance in flexible and/or foldable applications, especially when compared to conventional ion exchanged articles.

In some embodiments, the compressive stress layer of the glass-based article may include a compressive stress of at greater than or equal to 10 MPa, such as greater than or equal to 20 MPa, greater than or equal to 30 MPa, greater than or equal to 40 MPa, greater than or equal to 50 MPa, greater than or equal to 60 MPa, greater than or equal to 70 MPa, greater than or equal to 80 MPa, greater than or equal to 90 MPa, greater than or equal to 100 MPa, greater than or equal to 110 MPa, greater than or equal to 120 MPa, greater than or equal to 130 MPa, greater than or equal to 140 MPa, greater than or equal to 145 MPa, greater than or equal to 150 MPa, greater than or equal to 160 MPa, greater than or equal to 170 MPa, greater than or equal to 180 MPa, greater than or equal to 190 MPa, greater than or equal to 200 MPa, greater than or equal to 210 MPa, greater than or equal to 220 MPa, greater than or equal to 230 MPa, greater than or equal to 240 MPa, greater than or equal to 250 MPa, greater than or equal to 260 MPa, greater than or equal to 270 MPa, greater than or equal to 280 MPa, greater than or equal to 290 MPa, greater than or equal to 300 MPa, greater than or equal to 310 MPa, greater than or equal to 320 MPa, greater than or equal to 330 MPa, greater than or equal to 340 MPa, greater than or equal to 350 MPa, greater than or equal to 360 MPa, greater than or equal to 370 MPa, greater than or equal to 380 MPa, greater than or equal to 390 MPa, greater than or equal to 400 MPa, greater than or equal to 410 MPa, greater than or equal to 420 MPa, greater than or equal to 430 MPa, greater than or equal to 440 MPa, greater than or equal to 450 MPa, or more. In some embodiments, the compressive stress layer may include a compressive stress of from greater than or equal to 10 MPa to less than or equal to 500 MPa, such as from greater than or equal to 20 MPa to less than or equal to 490 MPa, from greater than or equal to 20 MPa to less than or equal to 480 MPa, from greater than or equal to 30 MPa to less than or equal to 470 MPa, from greater than or equal to 40 MPa to less than or equal to 460 MPa, from greater than or equal to 50 MPa to less than or equal to 450 MPa, from greater than or equal to 60 MPa to less than or equal to 440 MPa, from greater than or equal to 70 MPa to less than or equal to 430 MPa, from greater than or equal to 80 MPa to less than or equal to 420 MPa, from greater than or equal to 90 MPa to less than or equal to 410 MPa, from greater than or equal to 100 MPa to less than or equal to 400 MPa, from greater than or equal to 110 MPa to less than or equal to 390 MPa, from greater than or equal to 120 MPa to less than or equal to 380 MPa, from greater than or equal to 130 MPa to less than or equal to 370 MPa, from greater than or equal to 140 MPa to less than or equal to 360 MPa, from greater than or equal to 150 MPa to less than or equal to 350 MPa, from greater than or equal to 160 MPa to less than or equal to 340 MPa, from greater than or equal to 170 MPa to less than or equal to 330 MPa, from greater than or equal to 180 MPa to less than or equal to 320 MPa, from greater than or equal to 190 MPa to less than or equal to 310 MPa, from greater than or equal to 200 MPa to less than or equal to 300 MPa, from greater than or equal to 210 MPa to less than or equal to 290 MPa, from greater than or equal to 220 MPa to less than or equal to 280 MPa, from greater than or equal to 230 MPa to less than or equal to 270 MPa, from greater than or equal to 240 MPa to less than or equal to 260 MPa, 250 MPa, or any sub-ranges formed from any of these endpoints.

In some embodiments, the DOC of the compressive stress layer may be greater than or equal to 5 µm, such as greater than or equal to 7 µm, greater than or equal to 10 µm, greater than or equal to 15 µm, greater than or equal to 20 µm, greater than or equal to 25 µm, greater than or equal to 30 µm, greater than or equal to 35 µm, greater than or equal to 40 µm, greater than or equal to 45 µm, greater than or equal to 50 µm, greater than or equal to 55 µm, greater than or equal to 60 µm, greater than or equal to 65 µm, greater than or equal to 70 µm, greater than or equal to 75 µm, greater than or equal to 80 µm, greater than or equal to 85 µm, greater than or equal to 90 µm, greater than or equal to 95 µm, greater than or equal to 100 µm, greater than or equal to 105 µm, greater than or equal to 110 µm, greater than or equal to 115 µm, greater than or equal to 120 µm, greater than or equal to 125 µm, greater than or equal to 130 µm, greater than or equal to 135 µm, greater than or equal to 140 µm, greater than or equal to 145 µm, greater than or equal to 150 µm, greater than or equal to 155 µm, greater than or equal to 160 µm, greater than or equal to 165 µm, greater than or equal to 170 µm, greater than or equal to 175 µm, greater than or equal to 180 µm, greater than or equal to 185 µm, greater than or equal to 190 µm, greater than or equal to 195 µm, or more. In some embodiments, the DOC of the compressive stress layer may be from greater than or equal to 5 µm to less than or equal to 200 µm, such as from greater than or equal to 7 µm to less than or equal to 195 µm, from greater than or equal to 10 µm to less than or equal to 190 µm, from greater than or equal to 15 µm to less than or equal to 185 µm, from greater than or equal to 20 µm to less than or equal to 180 µm, from greater than or equal to 25 µm to less than or equal to 175 µm, from greater than or equal to 30 µm to less than or equal to 170 µm, from greater than or equal to 35 µm to less than or equal to 165 µm, from greater than or equal to 40 µm to less than or equal to 160 µm, from greater than or equal to 45 µm to less than or equal to 155 µm, from greater than or equal to 50 µm to less than or equal to 150 µm, from greater than or equal to 55 µm to less than or equal to 145 µm, from greater than or equal to 60 µm to less than or equal to 140 µm, from greater than or equal to 65 µm to less than or equal to 135 µm, from greater than or equal to 70 µm to less than or equal to 130 µm, from greater than or equal to 75 µm to less than or equal to 125 µm, from greater than or equal to 80 µm to less than or equal to 120 µm, from greater than or equal to 85 µm to less than or equal to 115 µm, from greater than or equal to 90 µm to less than or equal to 110 µm, 100 µm, or any sub-ranges that may be formed from any of these endpoints.

In some embodiments, the glass-based articles may have a DOC greater than or equal to 0.05t, wherein t is the thickness of the glass-based article, such as greater than or equal to 0.06t, greater than or equal to 0.07t, greater than or equal to 0.08t, greater than or equal to 0.09t, greater than or equal to 0.10t, greater than or equal to 0.11t, greater than or equal to 0.12t, greater than or equal to 0.13t, greater than or equal to 0.14t, greater than or equal to 0.15t, greater than or equal to 0.16t, greater than or equal to 0.17t, greater than or equal to 0.18t, greater than or equal to 0.19t, or more. In some embodiments, the glass-based articles may have a DOC from greater than or equal to 0.05t to less than or equal to 0.20t, such as from greater than or equal to 0.06t to less than or equal to 0.19t, from greater than or equal to 0.07t to less than or equal to 0.18t, from greater than or equal to 0.08t to less than or equal to 0.17t, from greater than or equal to 0.09t to less than or equal to 0.16t, from greater than or equal to 0.10t to less than or equal to 0.15t, from greater than or equal to 0.11t to less than or equal to 0.14t, from greater than or equal to 0.12t to less than or equal to 0.13t, or any sub-ranges formed from any of these endpoints.

In some embodiments, the maximum central tension (CT) of the glass-based article may be greater than or equal to 10 MPa, such as greater than or equal to 11 MPa, greater than or equal to 12 MPa, greater than or equal to 13 MPa, greater than or equal to 14 MPa, greater than or equal to 15 MPa, greater than or equal to 16 MPa, greater than or equal to 17 MPa, greater than or equal to 18 MPa, greater than or equal to 19 MPa, greater than or equal to 20 MPa, greater than or equal to 22 MPa, greater than or equal to 24 MPa, greater than or equal to 26 MPa, greater than or equal to 28 MPa, greater than or equal to 30 MPa, greater than or equal to 32 MPa, or more. In some embodiments, the CT of the glass-based article may be from greater than or equal to 10 MPa to less than or equal to 35 MPa, such as from greater than or equal to 11 MPa to less than or equal to 34 MPa, from greater than or equal to 12 MPa to less than or equal to 33 MPa, from greater than or equal to 13 MPa to less than or equal to 32 MPa, from greater than or equal to 14 MPa to less than or equal to 32 MPa, from greater than or equal to 15 MPa to less than or equal to 31 MPa, from greater than or equal to 16 MPa to less than or equal to 30 MPa, from greater than or equal to 17 MPa to less than or equal to 28 MPa, from greater than or equal to 18 MPa to less than or equal to 26 MPa, from greater than or equal to 19 MPa to less than or equal to 24 MPa, from greater than or equal to 20 MPa to less than or equal to 22 MPa, or any sub-ranges formed from any of these endpoints.

Compressive stress (including surface CS) is measured by surface stress meter using commercially available instruments such as the FSM-6000 (FSM), manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. DOC is measured by FSM. The maximum central tension (CT) values may be measured using a scattered light polariscope (SCALP) technique known in the art.

The presence of a hydrogen-containing layer in the glass-based articles may be directly measured. Alternatively, the presence of the hydrogen-containing layer may be indicated by the development of a reduced Young's modulus layer and/or a compressive stress layer in the glass-based article as a result of water vapor treatment.

The hydrogen-containing layer of the glass-based articles may have a hydrogen depth of layer (DOL) greater than 5 µm. In some embodiments, the hydrogen depth of layer may be greater than or equal to 10 µm, such as greater than or equal to 15 µm, greater than or equal to 20 µm, greater than or equal to 25 µm, greater than or equal to 30 µm, greater than or equal to 35 µm, greater than or equal to 40 µm, greater than or equal to 45 µm, greater than or equal to 50 µm, greater than or equal to 55 µm, greater than or equal to 60 µm, greater than or equal to 65 µm, greater than or equal to 70 µm, greater than or equal to 75 µm, greater than or equal to 80 µm, greater than or equal to 85 µm, greater than or equal to 90 µm, greater than or equal to 95 µm, greater than or equal to 100 µm, greater than or equal to 105 µm, greater than or equal to 110 µm, greater than or equal to 115 µm, greater than or equal to 120 µm, greater than or equal to 125 µm, greater than or equal to 130 µm, greater than or equal to 135 µm, greater than or equal to 140 µm, greater than or equal to 145 µm, greater than or equal to 150 µm, greater than or equal to 155 µm, greater than or equal to 160 µm, greater than or equal to 165 µm, greater than or equal to 170 µm, greater than or equal to 175 µm, greater than or equal to 180 µm, greater than or equal to 185 µm, greater than or equal to 190 µm, greater than or equal to 195 µm, greater than or equal to 200 µm, or more. In some embodiments, the hydrogen depth of layer may be from greater than 5 µm to less than or equal to 205 µm, such as from greater than or equal to 10 µm to less than or equal to 200 µm, from greater than or equal to 15 µm to less than or equal to 200 µm, from greater than or equal to 20 µm to less than or equal to 195 µm, from greater than or equal to 25 µm to less than or equal to 190 µm, from greater than or equal to 30 µm to less than or equal to 185 µm, from greater than or equal to 35 µm to less than or equal to 180 µm, from greater than or equal to 40 µm to less than or equal to 175 µm, from greater than or equal to 45 µm to less than or equal to 170 µm, from greater than or equal to 50 µm to less than or equal to 165 µm, from greater than or equal to 55 µm to less than or equal to 160 µm, from greater than or equal to 60 µm to less than or equal to 155 µm, from greater than or equal to 65 µm to less than or equal to 150 µm, from greater than or equal to 70 µm to less than or equal to 145 µm, from greater than or equal to 75 µm to less than or equal to 140 µm, from greater than or equal to 80 µm to less than or equal to 135 µm, from greater than or equal to 85 µm to less than or equal to 130 µm, from greater than or equal to 90 µm to less than or equal to 125 µm, from greater than or equal to 95 µm to less than or equal to 120 µm, from greater than or equal to 100 µm to less than or equal to 115 µm, from greater than or equal to 105 µm to less than or equal to 110 µm, or any sub-ranges formed by any of these endpoints. In general, the hydrogen depth of layer exhibited by the glass-based articles is greater than the hydrogen depth of layer that may be produced by exposure to the ambient environment.

The hydrogen-containing layer of the glass-based articles may have a hydrogen depth of layer (DOL) greater than 0.005t, wherein t is the thickness of the glass-based article. In some embodiments, the depth of layer may be greater than or equal to 0.010t, such as greater than or equal to 0.015t, greater than or equal to 0.020t, greater than or equal to 0.025t, greater than or equal to 0.030t, greater than or equal to 0.035t, greater than or equal to 0.040t, greater than or equal to 0.045t, greater than or equal to 0.050t, greater than or equal to 0.055t, greater than or equal to 0.060t, greater than or equal to 0.065t, greater than or equal to 0.070t, greater than or equal to 0.075t, greater than or equal to 0.080t, greater than or equal to 0.085t, greater than or equal to 0.090t, greater than or equal to 0.095t, greater than or equal to 0.10t, greater than or equal to 0.15t, greater than or equal to 0.20t, or more. In some embodiments, the hydrogen DOL may be from greater than 0.005t to less than or equal to 0.205t, such as from greater than or equal to 0.010t to less than or equal to 0.200t, from greater than or equal to 0.015t to less than or equal to 0.195t, from greater than or equal to 0.020t to less than or equal to 0.190t, from greater than or equal to 0.025t to less than or equal to 0.185t, from greater than or equal to 0.030t to less than or equal to 0.180t, from greater than or equal to 0.035t to less than or equal to 0.175t, from greater than or equal to 0.040t to less than or equal to 0.170t, from greater than or equal to 0.045t to less than or equal to 0.165t, from greater than or equal to 0.050t to less than or equal to 0.160t, from greater than or equal to 0.055t to less than or equal to 0.155t, from greater than or equal to 0.060t to less than or equal to 0.150t, from greater than or equal to 0.065t to less than or equal to 0.145t, from greater than or equal to 0.070t to less than or equal to 0.140t, from greater than or equal to 0.075t to less than or equal to 0.135t, from greater than or equal to 0.080t to less than or equal to 0.130t, from greater than or equal to 0.085t to less than or equal to 0.125t, from greater than or equal to 0.090t to less than or equal to 0.120t, from greater than or equal to 0.095t to less than or equal to 0.115t, from greater than or equal to 0.100t to less than or equal to 0.110t, or any sub-ranges formed by any of these endpoints.

The hydrogen depth of layer and hydrogen concentration are measured by a secondary ion mass spectrometry (SIMS) technique that is known in the art. The SIMS technique is capable of measuring the hydrogen concentration at a given depth but is not capable of distinguishing the hydrogen species present in the glass-based article. For this reason, all hydrogen species contribute to the SIMS measured hydrogen concentration. As utilized herein, the hydrogen depth of layer (DOL) refers to the first depth below the surface of the glass-based article where the hydrogen concentration is equal to the hydrogen concentration at the center of the glass-based article. This definition accounts for the hydrogen concentration of the glass-based substrate prior to treatment, such that the hydrogen depth of layer refers to the depth of the hydrogen added by the treatment process. As a practical matter, the hydrogen concentration at the center of the glass-based article may be approximated by the hydrogen concentration at the depth from the surface of the glass-based article where the hydrogen concentration becomes substantially constant, as the hydrogen concentration is not expected to change between such a depth and the center of the glass-based article. This approximation allows for the determination of the hydrogen DOL without measuring the hydrogen concentration throughout the entire depth of the glass-based article.

Without wishing to be bound by any particular theory, the hydrogen-containing layer of the glass-based articles may be the result of an interdiffusion of hydrogen species for ions contained in the compositions of the glass-based substrate. Hydrogen-containing species, such as $H_3O^+$, $H_2O$, and/or $H^+$, may diffuse into the glass-based substrate, and replace alkali ions and/or phosphorous contained in the glass-based substrate to form the glass-based article. Additionally, phosphorous appears to play a role in the formation of a compressive stress layer when the glass-based substrates are exposed to a water vapor containing environment and may have a particularly pronounced effect when the glass-based substrate contains both phosphorous and alkali metal oxides. Glass-based substrates containing potassium exhibit enhanced strengthening when exposed to water vapor containing environments in contrast to glass-based substrates containing sodium, indicating that lower cationic field strength allows enhanced strengthening through such treatments. Glass-based substrates containing lower cationic field strength alkali ions may have a lower oxygen packing density, and this may allow greater ease of hydrogen species, such as water, diffusion into the glass-based substrates. The incorporation of lower cationic field strength alkali ions may also assist in the extraction of phosphorous from the glass-based substrates when exposed to water containing environments, consistent with the depletion of phosphorous in the hydrogen containing layers that has been observed experimentally. One potential mechanism would at least partially explain such a behavior, is that $Q_0$ ($PO_4^{3-}$) units are less strongly bound to the glass network when lower cationic field strength alkali metals are employed. $Q_0$ ($PO_4^{3-}$) units contain four non-bridging oxygens, such that the unit consists of one doubly bonded oxygen atom and three oxygen anions that form ionic bonds with modifier ions.

Figure 2A:
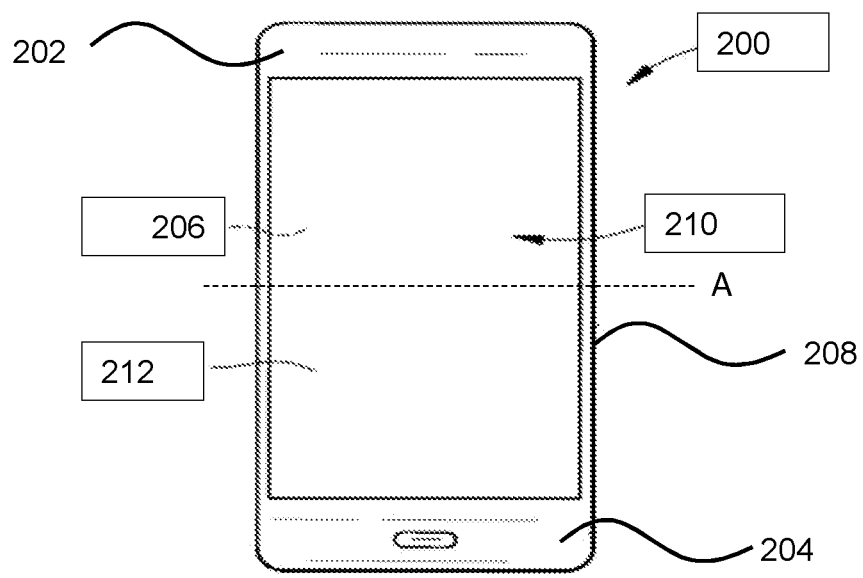
FIG. 2A is a plan view of an exemplary electronic device incorporating any of the glass-based articles disclosed herein.
Figure 2B:
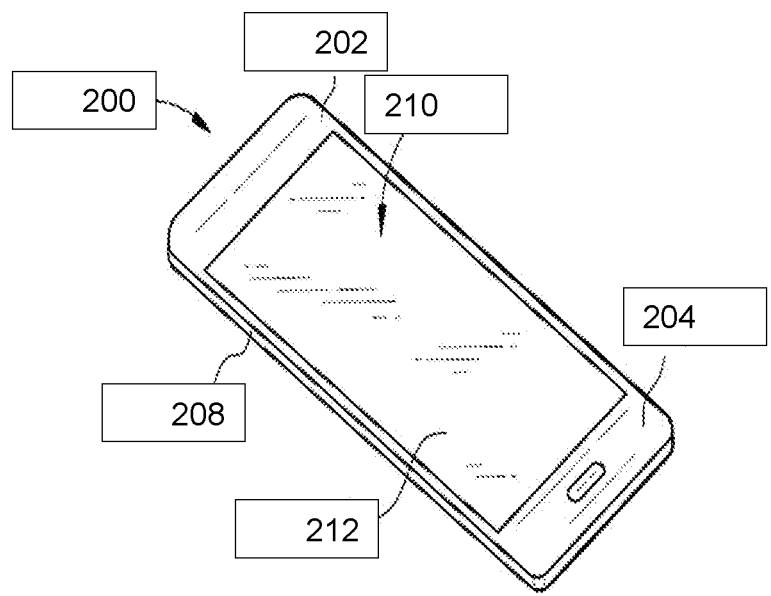
FIG. 2B is a perspective view of the exemplary electronic device of FIG. 2A.

The glass-based articles disclosed herein may be incorporated into another article such as an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the glass-based articles disclosed herein is shown in FIGS. 2A and 2B. Specifically, FIGS. 2A and 2B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, at least a portion of at least one of the cover substrate 212 and the housing 202 may include any of the glass-based articles disclosed herein. The consumer electronic device 200 may be a flexible or foldable device. For example, the consumer electronic device 200 may be foldable about axis A in FIG. 2A. Additionally, the consumer electronic device may be a flexible display, such as a flexible display that is incorporated in an automobile.

The glass-based articles described herein may additionally include coatings on a surface thereof. The coating may be a polymer coating, such as a polyimide. Polymer coatings may be present on one surface of the glass-based article, such as a user-facing surface, or may fully encapsulate the glass-based article. Full encapsulation prevents the introduction of additional flaws to the surface of the glass-based article, and allows any fragments produced in the event of fracture to be contained. A coating on one surface of the glass-based article may also contain any fragments produced in the event of fracture. The glass-based article may also include a scratch resistance hard coat of the type known in the art, alone or in addition to polymer coatings. The coatings may be directly bonded to the glass-based article or adhered by an adhesive layer. Polymer coatings may reduce the scratch resistance of the glass-based articles.

The glass-based articles may be formed from glass-based substrates having any appropriate composition. The composition of the glass-based substrate may be specifically selected to promote the diffusion of hydrogen-containing species, such that a glass-based article including a reduced Young's modulus layer and a compressive stress layer may be formed efficiently. In some embodiments, the glass-based substrates may have a composition that includes $SiO_2$, $Al_2O_3$, $K_2O$, and $P_2O_5$. In some embodiments, the glass-based substrates may additionally include another alkali metal oxide, such as at least one of $Li_2O$, $Na_2O$, $Rb_2O$, and $Cs_2O$. In some embodiments, the glass-based substrates may be substantially free, or free, of at least one of lithium and sodium. In some embodiments, the glass-based substrates may be substantially free, or free, of lithium and sodium. In some embodiments, the hydrogen species does not diffuse to the center of the glass-based article. Stated differently, the center of the glass-based article is the area least affected by the water vapor treatment. For this reason, the center of the glass-based article may have a composition that is substantially the same, or the same, as the composition of the glass-based substrate prior to treatment in the water containing environment.

The glass-based substrate may include any appropriate amount of $SiO_2$. $SiO_2$ is the largest constituent and, as such, $SiO_2$ is the primary constituent of the glass network formed from the glass composition. If the concentration of $SiO_2$ in the glass composition is too high, the formability of the glass composition may be diminished as higher concentrations of $SiO_2$ increase the difficulty of melting the glass, which, in turn, adversely impacts the formability of the glass. In some embodiments, the glass-based substrate may include $SiO_2$ in an amount from greater than or equal to 55 mol % to less than or equal to 70 mol %, such as from greater than or equal to 56 mol % to less than or equal to 69 mol %, from greater than or equal to 57 mol % to less than or equal to 68 mol %, from greater than or equal to 58 mol % to less than or equal to 67 mol %, from greater than or equal to 59 mol % to less than or equal to 66 mol %, from greater than or equal to 60 mol % to less than or equal to 65 mol %, from greater than or equal to 61 mol % to less than or equal to 64 mol %, from greater than or equal to 62 mol % to less than or equal to 63 mol %, or any sub-ranges formed by any of these endpoints. In some embodiments, the glass-based substrate may include $SiO_2$ in an amount of greater than or equal to 55 mol %.

The glass-based substrate may include any appropriate amount of $Al_2O_3$. $Al_2O_3$ may serve as a glass network former, similar to $SiO_2$. $Al_2O_3$ may increase the viscosity of the glass composition due to its tetrahedral coordination in a glass melt formed from a glass composition, decreasing the formability of the glass composition when the amount of $Al_2O_3$ is too high. However, when the concentration of $Al_2O_3$ is balanced against the concentration of $SiO_2$ and the concentration of alkali oxides in the glass composition, $Al_2O_3$ can reduce the liquidus temperature of the glass melt, thereby enhancing the liquidus viscosity and improving the compatibility of the glass composition with certain forming processes, such as the fusion forming process. The inclusion of $Al_2O_3$ in the glass-based substrate prevents phase separation and reduces the number of non-bridging oxygens (NBOs) in the glass. In some embodiments, the glass-based substrate may include $Al_2O_3$ in an amount of from greater than or equal to 3 mol % to less than or equal to 17 mol %, such as from greater than or equal to 4 mol % to less than or equal to 16 mol %, from greater than or equal to 5 mol % to less than or equal to 15 mol %, from greater than or equal to 6 mol % to less than or equal to 14 mol %, from greater than or equal to 7 mol % to less than or equal to 13 mol %, from greater than or equal to 8 mol % to less than or equal to 12 mol %, from greater than or equal to 9 mol % to less than or equal to 11 mol %, 10 mol %, or any sub-ranges formed by any of these endpoints.

The glass-based substrate may include any amount of $P_2O_5$ sufficient to produce the desired hydrogen diffusivity. The inclusion of phosphorous in the glass-based substrate promotes faster interdiffusion, regardless of the exchanging ionic pair. Thus, the phosphorous containing glass-based substrates allow the efficient formation of glass-based articles including a hydrogen-containing layer. The inclusion of $P_2O_5$ also allows for the production of a glass-based article with a deep hydrogen depth of layer (e.g., greater than about 10 μm) in a relatively short treatment time. The inclusion of $P_2O_5$ also contributes to a reduction in the bulk Young's modulus of the glass-based substrates. In some embodiments, the glass-based substrate may include $P_2O_5$ in an amount of from greater than or equal to 0.25 mol % to less than or equal to 15 mol %, such as from greater than or equal to 0.5 mol % to less than or equal to 15 mol %, from greater than or equal to 0.75 mol % to less than or equal to 14 mol %, from greater than or equal to 1 mol % to less than or equal to 13 mol %, from greater than or equal to 2 mol % to less than or equal to 12 mol %, from greater than or equal to 3 mol % to less than or equal to 11 mol %, from greater than or equal to 4 mol % to less than or equal to 10 mol %, from greater than or equal to 5 mol % to less than or equal to 9 mol %, from greater than or equal to 6 mol % to less than or equal to 8 mol %, 7 mol %, or any sub-ranges formed by any of these endpoints.

The glass-based substrates include $K_2O$. The inclusion of $K_2O$ allows, at least in part, the efficient exchange of hydrogen species into the glass substrate upon exposure to a water containing environment. The inclusion of $K_2O$ also contributes to a reduction in the bulk Young's modulus of the glass-based substrates. In embodiments, the glass-based substrate may include $K_2O$ in an amount of from greater than or equal to 5 mol % to less than or equal to 20 mol %, such as from greater than or equal to 6 mol % to less than or equal to 19 mol %, from greater than or equal to 7 mol % to less than or equal to 18 mol %, from greater than or equal to 8 mol % to less than or equal to 17 mol %, from greater than or equal to 9 mol % to less than or equal to 16 mol %, from greater than or equal to 10 mol % to less than or equal to 15 mol %, from greater than or equal to 11 mol % to less than or equal to 14 mol %, from greater than or equal to 12 mol % to less than or equal to 13 mol %, 11 mol %, or any sub-ranges formed from any of these endpoints. In embodiments, the glass-based substrates may be substantially free or free of alkali metal oxides other than $K_2O$, such as $Li_2O$, $Na_2O$, $Cs_2O$, and $Rb_2O$.

The glass-based substrate may include $Na_2O$ in any appropriate amount. In some embodiments, the glass-based substrate may include $Na_2O$ in an amount of from greater than or equal to 0 mol % to less than or equal to 10 mol %, such as from greater than or equal to 1 mol % to less than or equal to 9 mol %, from greater than or equal to 2 mol % to less than or equal to 8 mol %, from greater than or equal to 3 mol % to less than or equal to 7 mol %, from greater than or equal to 4 mol % to less than or equal to 6 mol %, 5 mol %, or any and all sub-ranges formed from these endpoints. In embodiments, the glass-based substrate may be substantially free or free of $Na_2O$.

The glass-based substrate may include $Li_2O$ in any appropriate amount. In some embodiments, the glass-based substrate may include $Li_2O$ in an amount of from greater than or equal to 0 mol % to less than or equal to 4 mol %, such as from greater than 0 mol % to less than or equal to 3 mol %, from greater than or equal to 1 mol % to less than or equal to 2 mol %, or any and all sub-ranges formed from any of these endpoints. In embodiments, the glass-based substrate may be substantially free or free of $Li_2O$.

The glass-based substrate may include $Rb_2O$ in any appropriate amount. In some embodiments, the glass-based substrate may include $Rb_2O$ in an amount of from greater than or equal to 0 mol % to less than or equal to 2 mol %, such as from greater than 0 mol % to less than or equal to 1 mol %, or any sub-range formed from any of these endpoints. In embodiments, the glass-based substrate may be substantially free or free of $Rb_2O$.

The glass-based substrate may include $Cs_2O$ in any appropriate amount. In some embodiments, the glass-based substrate may include $Cs_2O$ in an amount of from greater than or equal to 0 mol % to less than or equal to 10 mol %, such as from greater than or equal to 1 mol % to less than or equal to 9 mol %, from greater than or equal to 2 mol % to less than or equal to 8 mol %, from greater than or equal to 3 mol % to less than or equal to 7 mol %, from greater than or equal to 4 mol % to less than or equal to 6 mol %, 5 mol %, or any sub-range formed from any of these endpoints. In embodiments, the glass-based substrate may be substantially free or free of $Cs_2O$.

The glass-based substrate may additionally include $B_2O_3$. The inclusion of $B_2O_3$ in the glass-based substrates may increase the damage resistance of the glass-based substrates, and thereby increase the damage resistance of the glass-based articles formed therefrom. In some embodiments, the glass-based substrates may include $B_2O_3$ in an amount from greater than or equal to 0 mol % to less than or equal to 15 mol %, such as from greater than or equal to 1 mol % to less than or equal to 14 mol %, from greater than or equal to 2 mol % to less than or equal to 13 mol %, from greater than or equal to 3 mol % to less than or equal to 12 mol %, from greater than or equal to 4 mol % to less than or equal to 11 mol %, from greater than or equal to 5 mol % to less than or equal to 10 mol %, from greater than or equal to 6 mol % to less than or equal to 9 mol %, from greater than or equal to 7 mol % to less than or equal to 8 mol %, or any and all sub-ranges formed from these endpoints. In embodiments, the glass-based substrates may be substantially free or free of $B_2O_3$.

The glass-based substrate may additionally include MgO. In some embodiments, the glass-based substrates may include MgO in an amount from greater than or equal to 0 mol % to less than or equal to 5 mol %, such as from greater than or equal to 1 mol % to less than or equal to 4 mol %, from greater than or equal to 2 mol % to less than or equal to 3 mol %, or any and all sub-ranges formed from these endpoints. In embodiments, the glass-based substrates may be substantially free or free of MgO.

The glass-based substrate may additionally include ZnO. In some embodiments, the glass-based substrates may include ZnO in an amount from greater than or equal to 0 mol % to less than or equal to 5 mol %, such as from greater than or equal to 1 mol % to less than or equal to 4 mol %, from greater than or equal to 2 mol % to less than or equal to 3 mol %, or any and all sub-ranges formed from these endpoints. In embodiments, the glass-based substrates may be substantially free or free of ZnO.

The glass-based substrates may additionally include a fining agent. In some embodiments, the fining agent may include tin. In embodiments, the glass-based substrate may include $SnO_2$ in an amount from greater than or equal to 0 mol % to less than or equal to 0.5 mol %, such as from greater than 0 mol % to less than or equal to 0.1 mol %, or any and all sub-ranges formed from these endpoints.

In some embodiments, the glass-based substrate may have a composition including: from greater than or equal to 55 mol % to less than or equal to 70 mol % $SiO_2$, from greater than or equal to 3 mol % to less than or equal to 17 mol % $Al_2O_3$, from greater than or equal to 0.25 mol % to less than or equal to 15 mol % $P_2O_5$, and from greater than 5 mol % to less than or equal to 20 mol % $K_2O$.

In some embodiments, the glass-based substrate may have a composition including: from greater than or equal to 55 mol % to less than or equal to 70 mol % $SiO_2$, from greater than or equal to 3 mol % to less than or equal to 17 mol % $Al_2O_3$, from greater than or equal to 0.25 mol % to less than or equal to 15 mol % $P_2O_5$, from greater than or equal to 5 mol % to less than or equal to 23 mol % $K_2O$, from greater than or equal to 0 mol % to less than or equal to 15 mol % $B_2O_3$, from greater than or equal to 0 mol % to less than or equal to 10 mol % $Na_2O$, from greater than or equal to 0 mol % to less than or equal to 5 mol % ZnO, and from greater than or equal to 0 mol % to less than or equal to 0.5 mol % $SnO_2$.

In some embodiments, the glass-based substrate may have a composition including: from greater than or equal to 55 mol % to less than or equal to 70 mol % $SiO_2$, from greater than or equal to 3 mol % to less than or equal to 17 mol % $Al_2O_3$, from greater than or equal to 0.25 mol % to less than or equal to 15 mol % $P_2O_5$, from greater than or equal to 5 mol % to less than or equal to 23 mol % $K_2O$, from greater than or equal to 0 mol % to less than or equal to 15 mol % $B_2O_3$, from greater than or equal to 0 mol % to less than or equal to 10 mol % $Na_2O$, from greater than or equal to 0 mol % to less than or equal to 5 mol % ZnO, from greater than or equal to 0 mol % to less than or equal to 0.5 mol % $SnO_2$, from greater than or equal to 0 mol % to less than or equal to 5 mol % MgO, from greater than or equal to 0 mol % to less than or equal to 4 mol % $Li_2O$.

The glass-based substrates may have a low bulk Young's modulus. The composition of the glass-based substrates may be selected, such as by the inclusion of $K_2O$ and $P_2O_5$, to produce a low bulk Young's modulus. The low Young's modulus of the glass-based reduces the closing force necessary to achieve a given bend radius when compared to articles with a higher Young's modulus. In some embodiments, the glass-based substrates may have a bulk Young's modulus of less than or equal to 60 GPa, such as less than or equal to 59 GPa, less than or equal to 58 GPa, less than or equal to 57 GPa, less than or equal to 56 GPa, less than or equal to 55 GPa, less than or equal to 54 GPa, less than or equal to 53 GPa, or less. In some embodiments, the glass-based substrates may have a bulk Young's modulus of from greater than or equal to 50 GPa to less than or equal to 60 GPa, such as from greater than or equal to 51 GPa to less than or equal to 59 GPa, from greater than or equal to 52 GPa to less than or equal to 58 GPa, from greater than or equal to 53 GPa to less than or equal to 57 GPa, from greater than or equal to 54 GPa to less than or equal to 56 GPa, from greater than or equal to 50 GPa to less than or equal to 55 GPa, or any and all sub-ranges that may be formed by these endpoints. As utilized herein, the "bulk Young's modulus" refers to the Young's modulus as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts." It is expected that the bulk Young's modulus of the glass-based substrate will be substantially equivalent or equivalent to the bulk Young's modulus of a glass having a composition equivalent to the center of a glass-based article formed from the glass-based substrate, due to the minimal or lack of influence of hydrogen species at the center of the glass-based articles.

The glass-based articles may have a reduced closing force to produce a given bend radius, due at least in part to the low bulk Young's modulus of the glass-based substrates utilized to form the glass-based articles. The closing force may be calculated according to the following equation:

$$F = \frac{w \cdot t \cdot E_{Bulk}}{\sigma_{Bend\ max}^2}$$

where F is the closing force, w is the width of the glass-based article, t is the thickness of the glass-based article, $\sigma_{Bend\ max}$ is the maximum bend-induced stress as calculated above, and $E_{Bulk}$ is the bulk Young's modulus. The reduced Young's modulus layer has little impact on the closing force and may be ignored for this calculation.

The glass-based substrate may have any appropriate geometry. In some embodiments, the glass-based substrate may have a thickness of less than or equal to 2 mm, such as less than or equal to 1.9 mm, less than or equal to 1.8 mm, less than or equal to 1.7 mm, less than or equal to 1.6 mm, less than or equal to 1.5 mm, less than or equal to 1.4 mm, less than or equal to 1.3 mm, less than or equal to 1.2 mm, less than or equal to 1.1 mm, less than or equal to 1 mm, less than or equal to 900 µm, less than or equal to 800 µm, less than or equal to 700 µm, less than or equal to 600 µm, less than or equal to 500 µm, less than or equal to 400 µm, less than or equal to 300 µm, less than or equal to 200 µm, less than or equal to 100 µm, less than or equal to 50 µm, or less. In embodiments, the glass-based substrate may have a thickness from greater than or equal to 50 µm to less than or equal to 2 mm, such as from greater than or equal to 100 µm to less than or equal to 1.9 mm, from greater than or equal to 200 µm to less than or equal to 1.8 mm, from greater than or equal to 300 µm to less than or equal to 1.7 mm, from greater than or equal to 400 µm to less than or equal to 1.6 mm, from greater than or equal to 500 µm to less than or equal to 1.5 mm, from greater than or equal to 600 µm to less than or equal to 1.4 mm, from greater than or equal to 700 µm to less than or equal to 1.3 mm, from greater than or equal to 800 µm to less than or equal to 1.2 mm, from greater than or equal to 900 µm to less than or equal to 1.1 mm, 1 mm, or any and all sub-ranges formed from these endpoints. In some embodiments, the glass-based substrate may have a plate or sheet shape. In some other embodiments, the glass-based substrates may have a 2.5D or 3D shape. As utilized herein, a "2.5D shape" refers to a sheet shaped article with at least one major surface being at least partially nonplanar, and a second major surface being substantially planar. As utilized herein, a "3D shape" refers to an article with first and second opposing major surfaces that are at least partially nonplanar. The glass-based articles may have dimensions and shapes substantially similar or the same as the glass-based substrates from which they are formed.

The glass-based articles may be produced from the glass-based substrate by exposure to water vapor under any appropriate conditions. The exposure may be carried out in any appropriate device, such as a furnace with relative humidity control. The exposure may also be carried out at an elevated pressure, such as a furnace or autoclave with relative humidity and pressure control.

In some embodiments, the glass-based articles may be produced by exposing a glass-based substrate to an environment with a pressure greater than or equal to ambient pressure and containing water vapor. The environment may have a pressure greater than or equal to 0.1 MPa and a water partial pressure of greater than or equal to 0.05 MPa. The use of an elevated pressure environment allows for a higher concentration of water vapor in the environment, especially as temperatures are increased. For example, Table 1 below provides the concentration of water in the vapor phase at atmospheric pressure (0.1 MPa) for various temperatures.

TABLE I

| T (° C.) | Volume of 1 kg Water Vapor (m³) | Grams of Water per m³ |
|---|---|---|
| 100 | 1.6960 | 598 |
| 200 | 2.1725 | 460 |
| 300 | 2.6389 | 379 |
| 400 | 3.1027 | 322 |

At atmospheric pressure (0.1 MPa), the water vapor saturation condition is 99.61° C. As demonstrated by Table I, as the temperature increases the amount of water available for diffusion into the glass-based substrates to form glass-based articles decreases for a fixed volume, such as the interior of a furnace or autoclave. Thus, while increasing the temperature of the water vapor treatment environment may increase the rate of diffusion of hydrogen species into the glass-based substrate, reduced total water vapor concentration and may reduce the effectiveness of the treatment.

As temperatures increase, such as those above the atmospheric pressure saturation condition, applying increased pressure to reach the saturation condition increases the concentration of water vapor in the environment significantly. Table II below provides the saturation condition pressure for various temperatures and the associated concentration of water in the vapor phrase.

TABLE II

| T (° C.) | Pressure (MPa) | Volume of 1 kg Water Vapor (m³) | Grams of Water per m³ |
|---|---|---|---|
| 100 | 0.101 | 1.6719 | 598 |
| 200 | 1.555 | 0.1272 | 7862 |
| 300 | 8.5877 | 0.0217 | 46083 |
| 373.5 | 21.945 | 0.0037 | 270270 |

Figure 3:
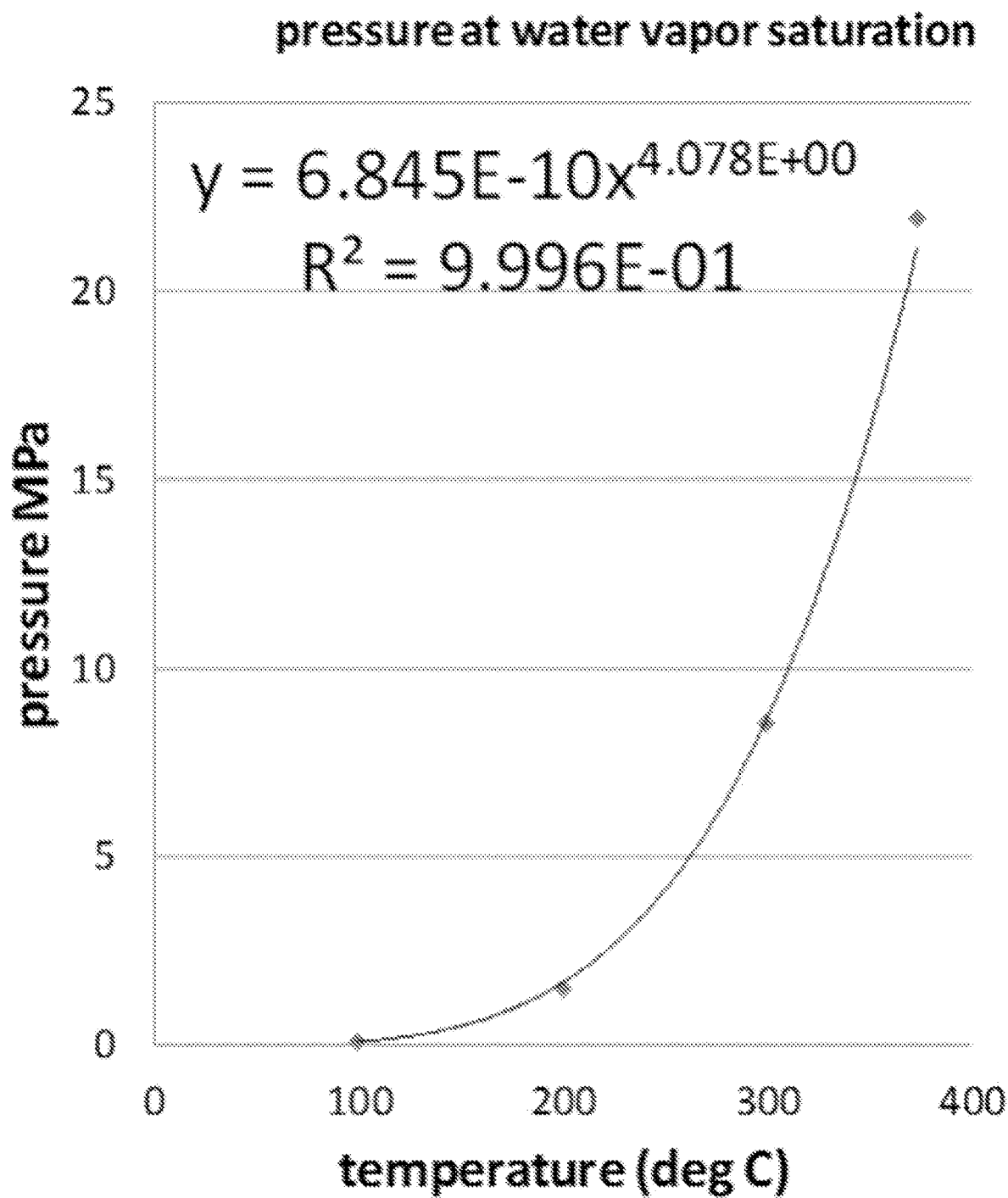
FIG. 3 is a plot of the saturation condition for water as a function or pressure and temperature.

The saturation condition for water vapor as a function of pressure and temperature is shown in FIG. 3. As shown in FIG. 3, the regions above the curve will result in condensation of water vapor into liquid which is undesirable. Thus, the water vapor treatment conditions utilized herein may preferably fall on or under the curve in FIG. 3, with further preferred conditions being on or just under the curve to maximize water vapor content. For these reasons, the water vapor treatment of the glass-based substrates may be carried out at elevated pressure.

In some embodiments, the glass-based substrates may be exposed to an environment at a pressure greater than or equal to 0.1 MPa, such as greater than or equal to 0.1 MPa, greater than or equal to 0.2 MPa, greater than or equal to 0.3 MPa, greater than or equal to 0.4 MPa, greater than or equal to 0.5 MPa, greater than or equal to 0.6 MPa, greater than or equal to 0.7 MPa, greater than or equal to 0.8 MPa, greater than or equal to 0.9 MPa, greater than or equal to 1.0 MPa, greater than or equal to 1.1 MPa, greater than or equal to 1.2 MPa, greater than or equal to 1.3 MPa, greater than or equal to 1.4 MPa, greater than or equal to 1.5 MPa, greater than or equal to 1.6 MPa, greater than or equal to 1.7 MPa, greater than or equal to 1.8 MPa, greater than or equal to 1.9 MPa, greater than or equal to 2.0 MPa, greater than or equal to 2.1 MPa, greater than or equal to 2.2 MPa, greater than or equal to 2.3 MPa, greater than or equal to 2.4 MPa, greater than or equal to 2.5 MPa, greater than or equal to 2.6 MPa, greater than or equal to 2.7 MPa, greater than or equal to 2.8 MPa, greater than or equal to 2.9 MPa, greater than or equal to 3.0 MPa, greater than or equal to 3.1 MPa, greater than or equal to 3.2 MPa, greater than or equal to 3.3 MPa, greater than or equal to 3.4 MPa, greater than or equal to 3.5 MPa, greater than or equal to 1.6 MPa, greater than or equal to 3.7 MPa, greater than or equal to 3.8 MPa, greater than or equal to 3.9 MPa, greater than or equal to 4.0 MPa, greater than or equal to 4.1 MPa, greater than or equal to 4.2 MPa, greater than or equal to 4.3 MPa, greater than or equal to 4.4 MPa, greater than or equal to 4.5 MPa, greater than or equal to 4.6 MPa, greater than or equal to 4.7 MPa, greater than or equal to 4.8 MPa, greater than or equal to 4.9 MPa, greater than or equal to 5.0 MPa, greater than or equal to 5.1 MPa, greater than or equal to 5.2 MPa, greater than or equal to 5.3 MPa, greater than or equal to 5.4 MPa, greater than or equal to 5.5 MPa, greater than or equal to 5.6 MPa, greater than or equal to 5.7 MPa, greater than or equal to 5.8 MPa, greater than or equal to 5.9 MPa, greater than or equal to 6.0 MPa, or more. In embodiments, the glass-based substrates may be exposed to an environment at a pressure of from greater than or equal to 0.1 MPa to less than or equal to 25 MPa, such as from greater than or equal to 0.2 MPa to less than or equal to 24 MPa, from greater than or equal to 0.3 MPa to less than or equal to 23 MPa, from greater than or equal to 0.4 MPa to less than or equal to 22 MPa, from greater than or equal to 0.5 MPa to less than or equal to 21 MPa, from greater than or equal to 0.6 MPa to less than or equal to 20 MPa, from greater than or equal to 0.7 MPa to less than or equal to 19 MPa, from greater than or equal to 0.8 MPa to less than or equal to 18 MPa, from greater than or equal to 0.9 MPa to less than or equal to 17 MPa, from greater than or equal to 1.0 MPa to less than or equal to 16 MPa, from greater than or equal to 1.1 MPa to less than or equal to 15 MPa, from greater than or equal to 1.2 MPa to less than or equal to 14 MPa, from greater than or equal to 1.3 MPa to less than or equal to 13 MPa, from greater than or equal to 1.4 MPa to less than or equal to 12 MPa, from greater than or equal to 1.5 MPa to less than or equal to 11 MPa, from greater than or equal to 1.6 MPa to less than or equal to 10 MPa, from greater than or equal to 1.7 MPa to less than or equal to 9 MPa, from greater than or equal to 1.8 MPa to less than or equal to 8 MPa, from greater than or equal to 1.9 MPa to less than or equal to 7 MPa, from greater than or equal to 1.9 MPa to less than or equal to 6.9 MPa, from greater than or equal to 2.0 MPa to less than or equal to 6.8 MPa, from greater than or equal to 2.1 MPa to less than or equal to 6.7 MPa, from greater than or equal to 2.2 MPa to less than or equal to 6.6 MPa, from greater than or equal to 2.3 MPa to less than or equal to 6.5 MPa, from greater than or equal to 2.4 MPa to less than or equal to 6.4 MPa, from greater than or equal to 2.5 MPa to less than or equal to 6.3 MPa, from greater than or equal to 2.6 MPa to less than or equal to 6.2 MPa, from greater than or equal to 2.7 MPa to less than or equal to 6.1 MPa, from greater than or equal to 2.8 MPa to less than or equal to 6.0 MPa, from greater than or equal to 2.9 MPa to less than or equal to 5.9 MPa, from greater than or equal to 3.0 MPa to less than or equal to 5.8 MPa, from greater than or equal to 3.1 MPa to less than or equal to 5.7 MPa, from greater than or equal to 3.2 MPa to less than or equal to 5.6 MPa, from greater than or equal to 3.3 MPa to less than or equal to 5.5 MPa, from greater than or equal to 3.4 MPa to less than or equal to 5.4 MPa, from greater than or equal to 3.5 MPa to less than or equal to 5.3 MPa, from greater than or equal to 3.6 MPa to less than or equal to 5.2 MPa, from greater than or equal to 3.7 MPa to less than or equal to 5.1 MPa, from greater than or equal to 3.8 MPa to less than or equal to 5.0 MPa, from greater than or equal to 3.9 MPa to less than or equal to 4.9 MPa, from greater than or equal to 4.0 MPa to less than or equal to 4.8 MPa, from greater than or equal to 4.1 MPa to less than or equal to 4.7

MPa, from greater than or equal to 4.2 MPa to less than or equal to 4.6 MPa, from greater than or equal to 4.3 MPa to less than or equal to 4.5 MPa, 4.4 MPa, or any and all sub-ranges formed from any of these endpoints.

In some embodiments, the glass-based substrates may be exposed to an environment with a water partial pressure greater than or equal to 0.05 MPa, such as greater than or equal to 0.075 MPa, greater than or equal to 0.1 MPa, greater than or equal to 0.2 MPa, greater than or equal to 0.3 MPa, greater than or equal to 0.4 MPa, greater than or equal to 0.5 MPa, greater than or equal to 0.6 MPa, greater than or equal to 0.7 MPa, greater than or equal to 0.8 MPa, greater than or equal to 0.9 MPa, greater than or equal to 1.0 MPa, greater than or equal to 1.1 MPa, greater than or equal to 1.2 MPa, greater than or equal to 1.3 MPa, greater than or equal to 1.4 MPa, greater than or equal to 1.5 MPa, greater than or equal to 1.6 MPa, greater than or equal to 1.7 MPa, greater than or equal to 1.8 MPa, greater than or equal to 1.9 MPa, greater than or equal to 2.0 MPa, greater than or equal to 2.1 MPa, greater than or equal to 2.2 MPa, greater than or equal to 2.3 MPa, greater than or equal to 2.4 MPa, greater than or equal to 2.5 MPa, greater than or equal to 2.6 MPa, greater than or equal to 2.7 MPa, greater than or equal to 2.8 MPa, greater than or equal to 2.9 MPa, greater than or equal to 3.0 MPa, greater than or equal to 3.1 MPa, greater than or equal to 3.2 MPa, greater than or equal to 3.3 MPa, greater than or equal to 3.4 MPa, greater than or equal to 3.5 MPa, greater than or equal to 1.6 MPa, greater than or equal to 3.7 MPa, greater than or equal to 3.8 MPa, greater than or equal to 3.9 MPa, greater than or equal to 4.0 MPa, greater than or equal to 4.1 MPa, greater than or equal to 4.2 MPa, greater than or equal to 4.3 MPa, greater than or equal to 4.4 MPa, greater than or equal to 4.5 MPa, greater than or equal to 4.6 MPa, greater than or equal to 4.7 MPa, greater than or equal to 4.8 MPa, greater than or equal to 4.9 MPa, greater than or equal to 5.0 MPa, greater than or equal to 5.1 MPa, greater than or equal to 5.2 MPa, greater than or equal to 5.3 MPa, greater than or equal to 5.4 MPa, greater than or equal to 5.5 MPa, greater than or equal to 5.6 MPa, greater than or equal to 5.7 MPa, greater than or equal to 5.8 MPa, greater than or equal to 5.9 MPa, greater than or equal to 6.0 MPa, greater than or equal to 7.0 MPa, greater than or equal to 8.0 MPa, greater than or equal to 9.0 MPa, greater than or equal to 10.0 MPa, greater than or equal to 11.0 MPa, greater than or equal to 12.0 MPa, greater than or equal to 13.0 MPa, greater than or equal to 14.0 MPa, greater than or equal to 15.0 MPa, greater than or equal to 16.0 MPa, greater than or equal to 17.0 MPa, greater than or equal to 18.0 MPa, greater than or equal to 19.0 MPa, greater than or equal to 20.0 MPa, greater than or equal to 21.0 MPa, greater than or equal to 22.0 MPa, or more. In embodiments, the glass-based substrates may be exposed to an environment with a water partial pressure from greater than or equal to 0.05 MPa to less than or equal to 22 MPa, such as from greater than or equal to 0.075 MPa to less than or equal to 22 MPa, from greater than or equal to 0.1 MPa to less than or equal to 21 MPa, from greater than or equal to 0.2 MPa to less than or equal to 20 MPa, from greater than or equal to 0.3 MPa to less than or equal to 19 MPa, from greater than or equal to 0.4 MPa to less than or equal to 18 MPa, from greater than or equal to 0.5 MPa to less than or equal to 17 MPa, from greater than or equal to 0.6 MPa to less than or equal to 16 MPa, from greater than or equal to 0.7 MPa to less than or equal to 15 MPa, from greater than or equal to 0.8 MPa to less than or equal to 14 MPa, from greater than or equal to 0.9 MPa to less than or equal to 13 MPa, from greater than or equal to 1.0 MPa to less than or equal to 12 MPa, from greater than or equal to 1.1 MPa to less than or equal to 11 MPa, from greater than or equal to 1.2 MPa to less than or equal to 10 MPa, from greater than or equal to 1.3 MPa to less than or equal to 9 MPa, from greater than or equal to 1.4 MPa to less than or equal to 8 MPa, from greater than or equal to 1.5 MPa to less than or equal to 7 MPa, from greater than or equal to 1.6 MPa to less than or equal to 6.9 MPa, from greater than or equal to 1.7 MPa to less than or equal to 6.8 MPa, from greater than or equal to 1.8 MPa to less than or equal to 6.7 MPa, from greater than or equal to 1.9 MPa to less than or equal to 6.6 MPa, from greater than or equal to 2.0 MPa to less than or equal to 6.5 MPa, from greater than or equal to 2.1 MPa to less than or equal to 6.4 MPa, from greater than or equal to 2.2 MPa to less than or equal to 6.3 MPa, from greater than or equal to 2.3 MPa to less than or equal to 6.2 MPa, from greater than or equal to 2.4 MPa to less than or equal to 6.1 MPa, from greater than or equal to 2.5 MPa to less than or equal to 6.0 MPa, from greater than or equal to 2.6 MPa to less than or equal to 5.9 MPa, from greater than or equal to 2.7 MPa to less than or equal to 5.8 MPa, from greater than or equal to 2.8 MPa to less than or equal to 5.7 MPa, from greater than or equal to 2.9 MPa to less than or equal to 5.6 MPa, from greater than or equal to 3.0 MPa to less than or equal to 5.5 MPa, from greater than or equal to 3.1 MPa to less than or equal to 5.4 MPa, from greater than or equal to 3.2 MPa to less than or equal to 5.3 MPa, from greater than or equal to 3.3 MPa to less than or equal to 5.2 MPa, from greater than or equal to 3.4 MPa to less than or equal to 5.1 MPa, from greater than or equal to 3.5 MPa to less than or equal to 5.0 MPa, from greater than or equal to 3.6 MPa to less than or equal to 4.9 MPa, from greater than or equal to 3.7 MPa to less than or equal to 4.8 MPa, from greater than or equal to 3.8 MPa to less than or equal to 4.7 MPa, from greater than or equal to 3.9 MPa to less than or equal to 4.6 MPa, from greater than or equal to 4.0 MPa to less than or equal to 4.5 MPa, from greater than or equal to 4.1 MPa to less than or equal to 4.4 MPa, from greater than or equal to 4.2 MPa to less than or equal to 4.3 MPa, or any and all sub-ranges formed from any of these endpoints.

In some embodiments, the glass-based substrates may be exposed to an environment with a relative humidity of greater than or equal to 75%, such as greater than or equal to 80%, greater than or equal to 85%, greater than or equal to 90%, greater than or equal to 95%, greater than or equal to 99%, or more. In some embodiments, the glass-based substrate may be exposed to an environment with 100% relative humidity. In some embodiments, the glass-based substrates may be exposed to a saturated steam environment.

In some embodiments, the glass-based substrates may be exposed to an environment at with a temperature of greater than or equal to 85° C., such as greater than or equal to 90° C., greater than or equal to 95° C., greater than or equal to 100° C., greater than or equal to 105° C., greater than or equal to 110° C., greater than or equal to 115° C., greater than or equal to 120° C., greater than or equal to 125° C., greater than or equal to 130° C., greater than or equal to 135° C., greater than or equal to 140° C., greater than or equal to 145° C., greater than or equal to 150° C., greater than or equal to 155° C., greater than or equal to 160° C., greater than or equal to 165° C., greater than or equal to 170° C., greater than or equal to 175° C., greater than or equal to 180° C., greater than or equal to 185° C., greater than or equal to 190° C., greater than or equal to 195° C., greater than or equal to 200° C., greater than or equal to 205° C., greater than or equal to 210° C., greater than or equal to 215° C., greater than or equal to 220° C., greater than or equal to 225° C., greater than or equal to 230° C., greater than or equal to 235° C., greater than or equal to 240° C., greater than or equal to 245° C., greater than or equal to 250° C., greater than or equal to 255° C., greater than or equal to 260° C., greater than or equal to 265° C., greater than or equal to 270° C., greater than or equal to 275° C., greater than or equal to 280° C., greater than or equal to 285° C., greater than or equal to 290° C., greater than or equal to 295° C., greater than or equal to 300° C., or more. In some embodiments, the glass-based substrates may be exposed to an environment with a temperature from greater than or equal to 85° C. to less than or equal to 400° C., such as from greater than or equal to 90° C. to less than or equal to 400° C., from greater than or equal to 95° C. to less than or equal to 400° C., from greater than or equal to 100° C. to less than or equal to 400° C., from greater than or equal to 105° C. to less than or equal to 390° C., from greater than or equal to 110° C. to less than or equal to 380° C., from greater than or equal to 115° C. to less than or equal to 370° C., from greater than or equal to 120° C. to less than or equal to 360° C., from greater than or equal to 125° C. to less than or equal to 350° C., from greater than or equal to 130° C. to less than or equal to 340° C., from greater than or equal to 135° C. to less than or equal to 330° C., from greater than or equal to 140° C. to less than or equal to 320° C., from greater than or equal to 145° C. to less than or equal to 310° C., from greater than or equal to 150° C. to less than or equal to 300° C., from greater than or equal to 155° C. to less than or equal to 295° C., from greater than or equal to 160° C. to less than or equal to 290° C., from greater than or equal to 165° C. to less than or equal to 285° C., from greater than or equal to 170° C. to less than or equal to 280° C., from greater than or equal to 175° C. to less than or equal to 275° C., from greater than or equal to 180° C. to less than or equal to 270° C., from greater than or equal to 185° C. to less than or equal to 265° C., from greater than or equal to 190° C. to less than or equal to 260° C., from greater than or equal to 195° C. to less than or equal to 255° C., from greater than or equal to 200° C. to less than or equal to 250° C., from greater than or equal to 205° C. to less than or equal to 245° C., from greater than or equal to 210° C. to less than or equal to 240° C., from greater than or equal to 215° C. to less than or equal to 235° C., from greater than or equal to 220° C. to less than or equal to 230° C., 225° C., or any and all sub-ranges formed from any of these endpoints. In some embodiments, the glass-based substrates may be exposed to an environment at with a temperature of greater than or equal to 200° C.

In some embodiments, the glass-based substrate may be exposed to the water vapor containing environment for a time period sufficient to produce the desired degree of hydrogen-containing species diffusion, as evidenced by the desired reduced Young's modulus layer and the desired compressive stress layer. In some embodiments, the glass-based substrate may be exposed to the water vapor containing environment for greater than or equal to 2 hours, such as greater than or equal to 4 hours, greater than or equal to 6 hours, greater than or equal to 8 hours, greater than or equal to 10 hours, greater than or equal to 12 hours, greater than or equal to 14 hours, greater than or equal to 16 hours, greater than or equal to 18 hours, greater than or equal to 20 hours, greater than or equal to 22 hours, greater than or equal to 24 hours, greater than or equal to 30 hours, greater than or equal to 36 hours, greater than or equal to 42 hours, greater than or equal to 48 hours, greater than or equal to 54 hours, greater than or equal to 60 hours, greater than or equal to 66 hours, greater than or equal to 72 hours, greater than or equal to 78 hours, greater than or equal to 84 hours, greater than or equal to 90 hours, greater than or equal to 96 hours, greater than or equal to 102 hours, greater than or equal to 108 hours, greater than or equal to 114 hours, greater than or equal to 120 hours, greater than or equal to 126 hours, greater than or equal to 132 hours, greater than or equal to 138 hours, greater than or equal to 144 hours, greater than or equal to 150 hours, greater than or equal to 156 hours, greater than or equal to 162 hours, greater than or equal to 168 hours, or more. In some embodiments, the glass-based substrate may be exposed to the water vapor containing environment for a time period from greater than or equal to 2 hours to less than or equal to 10 days, such as from greater than or equal to 4 hours to less than or equal to 9 days, from greater than or equal to 6 hours to less than or equal to 8 days, from greater than or equal to 8 hours to less than or equal to 168 hours, from greater than or equal to 10 hours to less than or equal to 162 hours, from greater than or equal to 12 hours to less than or equal to 156 hours, from greater than or equal to 14 hours to less than or equal to 150 hours, from greater than or equal to 16 hours to less than or equal to 144 hours, from greater than or equal to 18 hours to less than or equal to 138 hours, from greater than or equal to 20 hours to less than or equal to 132 hours, from greater than or equal to 22 hours to less than or equal to 126 hours, from greater than or equal to 24 hours to less than or equal to 120 hours, from greater than or equal to 30 hours to less than or equal to 114 hours, from greater than or equal to 36 hours to less than or equal to 108 hours, from greater than or equal to 42 hours to less than or equal to 102 hours, from greater than or equal to 48 hours to less than or equal to 96 hours, from greater than or equal to 54 hours to less than or equal to 90 hours, from greater than or equal to 60 hours to less than or equal to 84 hours, from greater than or equal to 66 hours to less than or equal to 78 hours, 72 hours, or any and all sub-ranges formed from any of these endpoints.

In some embodiments, the glass-based substrates may be exposed to multiple water vapor containing environments. In embodiments, the glass-based substrate may be exposed to a first environment to form a first glass-based article with a first compressive stress layer extending from a surface of the first glass-based article to a first depth of compression, and the first glass-based article may then be exposed to a second environment to form a second glass-based article with a second compressive stress layer extending from a surface of the second glass-based article to a second depth of compression. The first environment has a first water partial pressure and a first temperature, and the glass-based substrate is exposed to the first environment for a first time period. The second environment has a second water partial pressure and a second temperature, and the first glass-based article is exposed to the second environment for a second time period.

The first water partial pressure and the second water partial pressure may be any appropriate partial pressure, such as greater than or equal to 0.05 MPa. The first and second partial pressure may be any of the values disclosed herein with respect to the water partial pressures employed in the elevated pressure method. In embodiments, the first and second environments may have, independently, a relative humidity of greater than or equal to 75%, such as greater than or equal to 80%, greater than or equal to 90%, greater than or equal to 95%, or equal to 100%. In some embodiments, at least one of the first environment and the second environment has a relative humidity of 100%.

The first compressive stress layer includes a first maximum compressive stress, and the second compressive stress layer includes a second maximum compressive stress. In embodiments, the first maximum compressive stress is less than the second maximum compressive stress. The second maximum compressive stress may be compared to a compressive stress "spike" of the type formed through multi-step or mixed bath ion exchange techniques. The first and second maximum compressive stress may have any of the values disclosed herein with respect to the compressive stress of the glass-based article. In embodiments, the second maximum compressive stress may be greater than or equal to 50 MPa.

The first depth of compression may be less than or equal to the second depth of compression. In some embodiments, the first depth of compression is less than the second depth of compression. The first depth of compression and the second depth of compression may have any of the values disclosed herein with respect to the depth of compression. In embodiments, the second depth of compression is greater than 5 µm.

The first temperature may be greater than or equal to the second temperature. In embodiments, the first temperature is greater than the second temperature. The first and second temperatures may be any of the temperatures disclosed in connection with the elevated pressure method.

The first time period may be less than or equal to the second time period. In embodiments, the first time period is less than the second time period. The first and second time periods may be any of the time periods disclosed in connection with the elevated pressure method.

In embodiments, any or all of the multiple exposures to a water vapor containing environment may be performed at an elevated pressure. For example, at least one of the first environment and the second environment may have a pressure greater than 0.1 MPa. The first and second environments may have any pressure disclose in connection with the elevated pressure method.

In some embodiments, the multiple water vapor environment exposure technique may include more than two exposure environments. In embodiments, the second glass-based article may be exposed to a third environment to form a third glass-based article. The third environment has a third water partial pressure and a third temperature, and the second glass-based article is exposed to the third environment for a third time period. The third glass-based article includes a third compressive stress layer extending from a surface of the article to a third depth of compression and having a third maximum compressive stress. The third water partial pressure may be greater than or equal to 0.05 MPa. The values of any of the properties of the third environment and third glass-based article may be selected from those disclosed for the corresponding properties in connection with the elevated pressure method.

In some embodiments, the first glass-based article may be cooled to ambient temperature or otherwise removed from the first environment after the conclusion of the first time period and prior to being exposed to the second environment. In some embodiments, the first glass-based article may remain in the first environment after the conclusion of the first time period, and the first environment conditions may be changed to the second environment conditions without cooling to ambient temperature or removing the first glass-based article from the water vapor containing environment.

The methods of producing the glass-based articles disclosed herein may be free of an ion exchange treatment with an alkali ion source. In embodiments, the glass-based articles are produced by methods that do not include an ion exchange with an alkali ion source.

The exposure conditions may be modified to reduce the time necessary to produce the desired amount of hydrogen-containing species diffusion into the glass-based substrate. For example, the temperature and/or relative humidity may be increased to reduce the time required to achieve the desired degree of hydrogen-containing species diffusion and depth of layer into the glass-based substrate.

Exemplary Embodiments

Glass compositions that are particularly suited for formation of the glass-based articles described herein were formed into glass-based substrates, and the glass compositions are provided in Table III below. The density of the glass compositions was determined using the buoyancy method of ASTM C693-93(2013). The linear coefficient of thermal expansion (CTE) over the temperature range 25° C. to 300° C. is expressed in terms of $10^{-7}$/° C. and was determined using a push-rod dilatometer in accordance with ASTM E228-11. The strain point and anneal point were determined using the beam bending viscosity method of ASTM C598-93(2013). The softening point was determined using the parallel plate viscosity method of ASTM C1351M-96 (2012). Stress optical coefficient (SOC) was measured according to Procedure C (Glass Disc Method) described in ASTM standard C770-16, entitled "Standard Test Method for Measurement of Glass Stress-Optical Coefficient." Refractive index was measured at a wavelength of 589.3 nm. Bulk Young's modulus and Poisson's ratio were measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts." Young's modulus at 500 nm was measured with a nanoindentation probe with a Berkovich diamond tip.

TABLE III

| | Composition | | | | | | |
|---|---|---|---|---|---|---|---|
| | 1 | 2 | 3 | 4 | 5 | 6 | 7 |
| $SiO_2$ | 66.81 | 62.54 | 63.56 | 62.18 | 59.67 | 60.85 | 61.81 |
| $Al_2O_3$ | 11.01 | 11.02 | 10.52 | 11.07 | 11.05 | 10.56 | 8.14 |
| $P_2O_5$ | 3.98 | 8.46 | 8.47 | 8.39 | 8.40 | 8.38 | 4.78 |
| $B_2O_3$ | 0.00 | 0.00 | 0.00 | 0.00 | 2.95 | 2.96 | 14.39 |
| $Na_2O$ | 0.27 | 0.20 | 0.18 | 0.22 | 0.20 | 0.18 | 0.00 |
| $K_2O$ | 13.98 | 15.75 | 15.74 | 15.68 | 15.71 | 15.55 | 10.88 |
| ZnO | 3.95 | 1.97 | 1.47 | 2.40 | 1.96 | 1.47 | 0.00 |
| $SnO_2$ | 0.00 | 0.05 | 0.05 | 0.05 | 0.06 | 0.05 | 0.00 |

TABLE III-continued

| | Composition | | | | | | |
|---|---|---|---|---|---|---|---|
| | 1 | 2 | 3 | 4 | 5 | 6 | 7 |
| | Properties | | | | | | |
| Density (g/cm³) | 2.432 | 2.397 | 2.388 | 2.406 | 2.403 | 2.396 | 2.310 |
| CTE *10⁻⁷ (1/° C.) | 88.20 | 93.70 | 94.60 | 93.00 | 93.30 | 93.40 | 74.50 |
| Strain Pt. (° C.) | 714 | 565 | 555 | 569 | | | 475 |
| Anneal Pt. (° C.) | 782 | 625 | 615 | 629 | | | 526 |
| Softening Pt. (° C.) | 1040.8 | 946.8 | | | | | 757.0 |
| SOC (nm/mm/MPa) | 3.088 | 3.092 | 3.028 | 3.121 | 3.188 | 3.126 | 3.133 |
| Refractive Index at 589.3 nm | 1.4918 | 1.4845 | 1.4833 | 1.4850 | 1.4872 | 1.4860 | 1.4833 |
| Bulk Young's Modulus (GPa) | | 52.9 | 60.4 | 53.0 | 53.2 | 53.0 | 53.0 |
| Poisson's Ratio | | 0.2220 | 0.2180 | 0.2200 | 0.2270 | 0.2240 | 0.2187 |
| Young's Modulus at 500 nm (GPa) | 59.8 | 54.1 | 53.5 | 54.5 | 54.6 | 55.5 | 55.5 |

Samples having the compositions shown in Table III and having a thickness of 1 mm were exposed to water vapor containing environments to form glass articles having reduced Young's modulus layers. The sample composition and the environment the samples were exposed to, including the temperature, pressure, and exposure time are shown in Table IV below. Each of the treatment environments were saturated with water vapor. The resulting maximum compressive stress and depth of compression as measured by surface stress meter (FSM) is also reported in Table IV. No compressive stress or depth of compression measurement was returned by FSM for the article based on Composition 3, as indicated by the "*".

Figure 5:
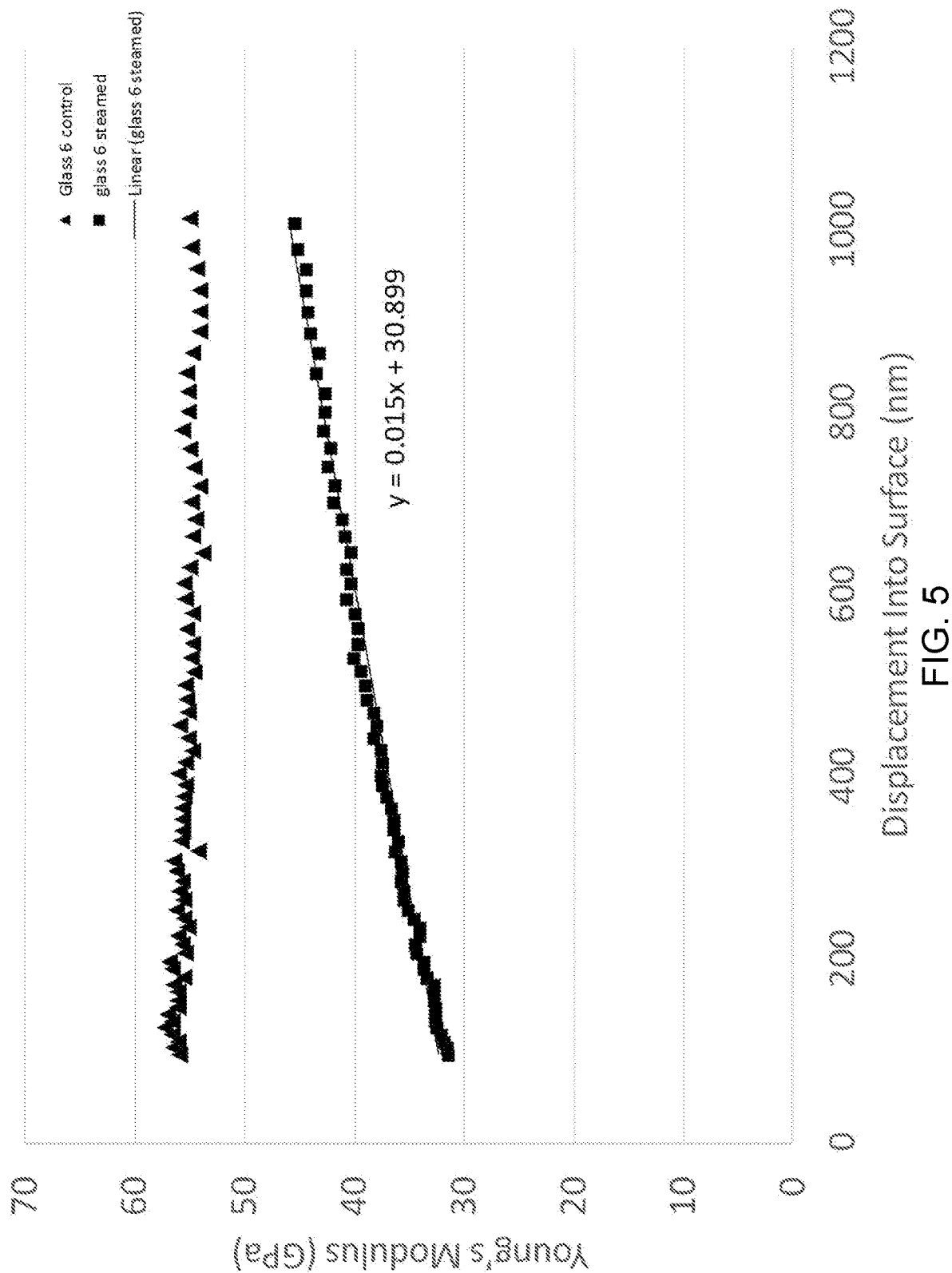
FIG. 5 is a plot of Young's modulus as a function of depth for an untreated glass substrate and a treated glass article according to an embodiment.

The Young's modulus as a function of depth below the surface was measured by nanoindenter for an untreated glass substrate formed from composition 6 (control) and for a glass article formed after exposure of a glass substrate formed from composition 6 to a water vapor saturated environment at 200° C. at 1.6 MPa for 18 hours (steamed). The measured Young's modulus profile for the control and steamed samples are shown in FIG. 5. The treated (steamed) sample demonstrated a significantly reduction in Young's modulus in the near surface region. By way of example, at a 500 nm depth the glass substrate (control) had a Young's modulus of 55.5 GPa while the treated (steamed) sample had a Young's modulus at 500 nm depth of 39 GPa. A linear fit of the Young's modulus profile of the treated (steamed)

TABLE IV

| Composition | 1 | 2 | 3 | 4 | 5 | 6 | 7 |
|---|---|---|---|---|---|---|---|
| Treatment Temperature (° C.) | 250 | 200 | 200 | 200 | 200 | 200 | 200 |
| Treatment Pressure (MPa) | 4 | 1.6 | 1.6 | 1.6 | 1.6 | 1.6 | 1.6 |
| Treatment Time (h) | 6 | 18 | 18 | 18 | 18 | 18 | 9 |
| Young's Modulus at 500 nm (GPa) | 54.4 | 41.4 | 41.9 | 47.5 | 51.1 | 39.0 | 49.2 |
| Decrease in Young's Modulus at 500 nm (%) | 9.03 | 23.48 | 21.68 | 12.84 | 6.41 | 29.73 | 11.35 |
| Compressive Stress (MPa) | 327 | 178 | * | 279 | 262 | 176 | 144 |
| Depth of Compression (μm) | 27 | 32 | * | 35 | 26 | 22 | 7 |

Substrates formed from the glass compositions of Table III were also treated at 150° C. at a pressure of 0.5 MPa in a water vapor saturated environment, but no measurable reduction in Young's modulus was produced.

sample in the region of 500 nm to 1000 nm is also shown in FIG. 5, with linear fit intersecting the bulk Young's modulus of the untreated glass composition at a depth of approximately 1500 nm.

Figure 6:
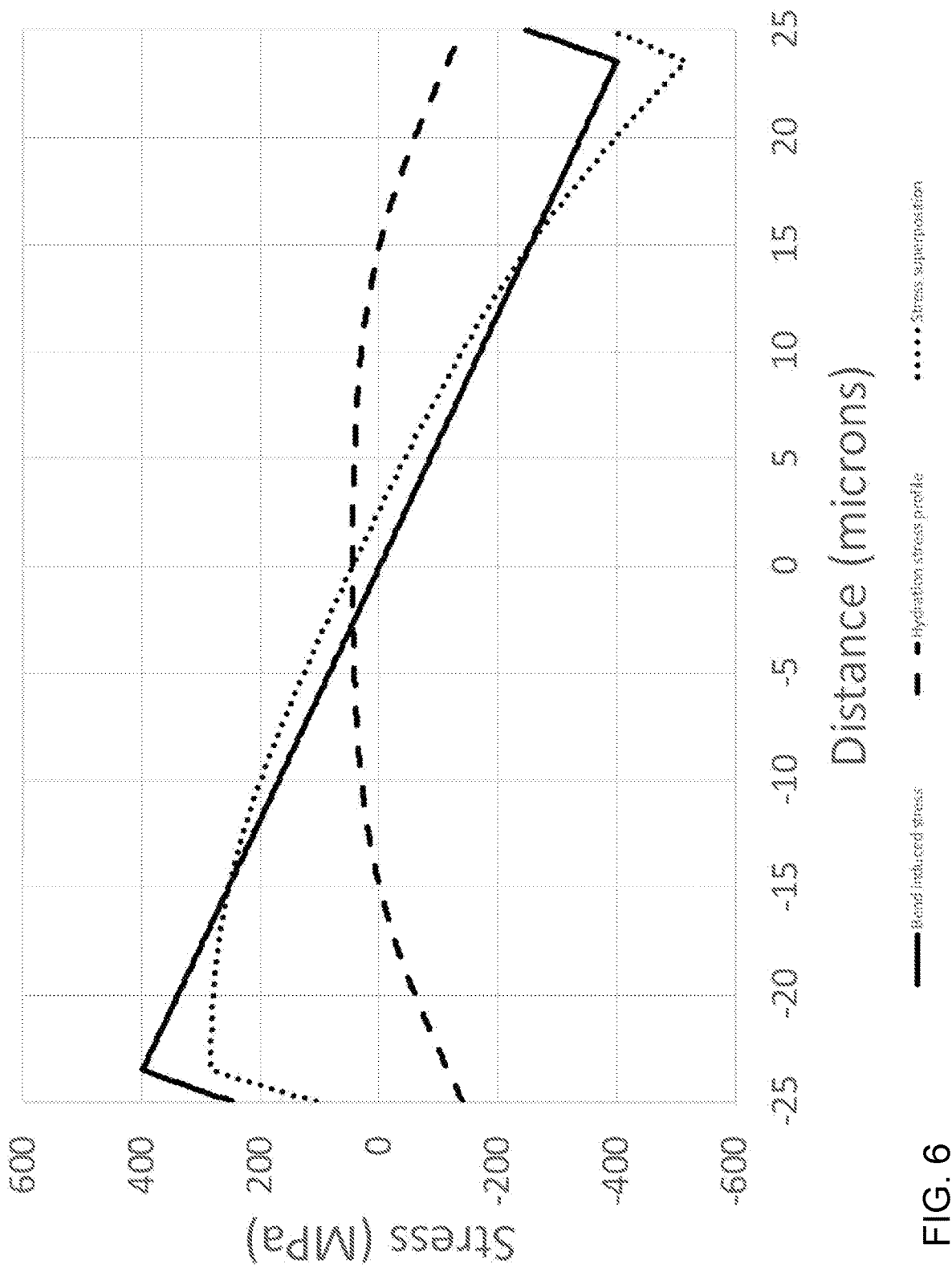
FIG. 6 is a plot of bend-induced stress, hydration-induced stress, and combined stress as a function of depth for a bent treated glass article according to an embodiment.

The bend induced stress of a treated glass article based on composition 6 and the associated treatment conditions in Table IV above was calculated for a bend radius of 3.3 mm and an article thickness of 50 μm and is shown in FIG. 6. The reduced Young's modulus values in the near-surface region were determined by extrapolating the linear fit from FIG. 5 from the surface of the article to the depth of layer (approximately 1500 nm) at which the base composition bulk Young's modulus value is achieved. The reduced Young's modulus values were incorporated into the calculation of the bend-induced stress and correspond to the reduction in bend-induced stress magnitude at each surface in the article shown in FIG. 6.

The stress profile that was produced as a result of the hydration treatment of the article was measured as reported in Table IV and scaled to a thickness of 50 μm, with the depth of compression limited to 20% of the thickness. The scaled hydration-induced stress profile is also shown in FIG. 6, together with a superposition of the bend-induced stress and the hydration-induced stress. The scaling of the compressive stress was based on observations that the compressive stress for an article thickness of 50 μm is approximately 80% of the compressive stress for an article thickness of 1 mm.

A stress intensity of 0.155 MPa√m for a crack depth of 500 nm and a geometry factor of 0.73 for the bent article of FIG. 6 was calculated. The stress intensity value was significantly less than the static fatigue limit expected for potassium-containing glasses of 0.4 MPa√m. Utilizing the static fatigue limit value, the superposition stress profile of FIG. 3 is expected to be resistant to crack growth for crack depths of up to 1.35 microns.

Figure 7:
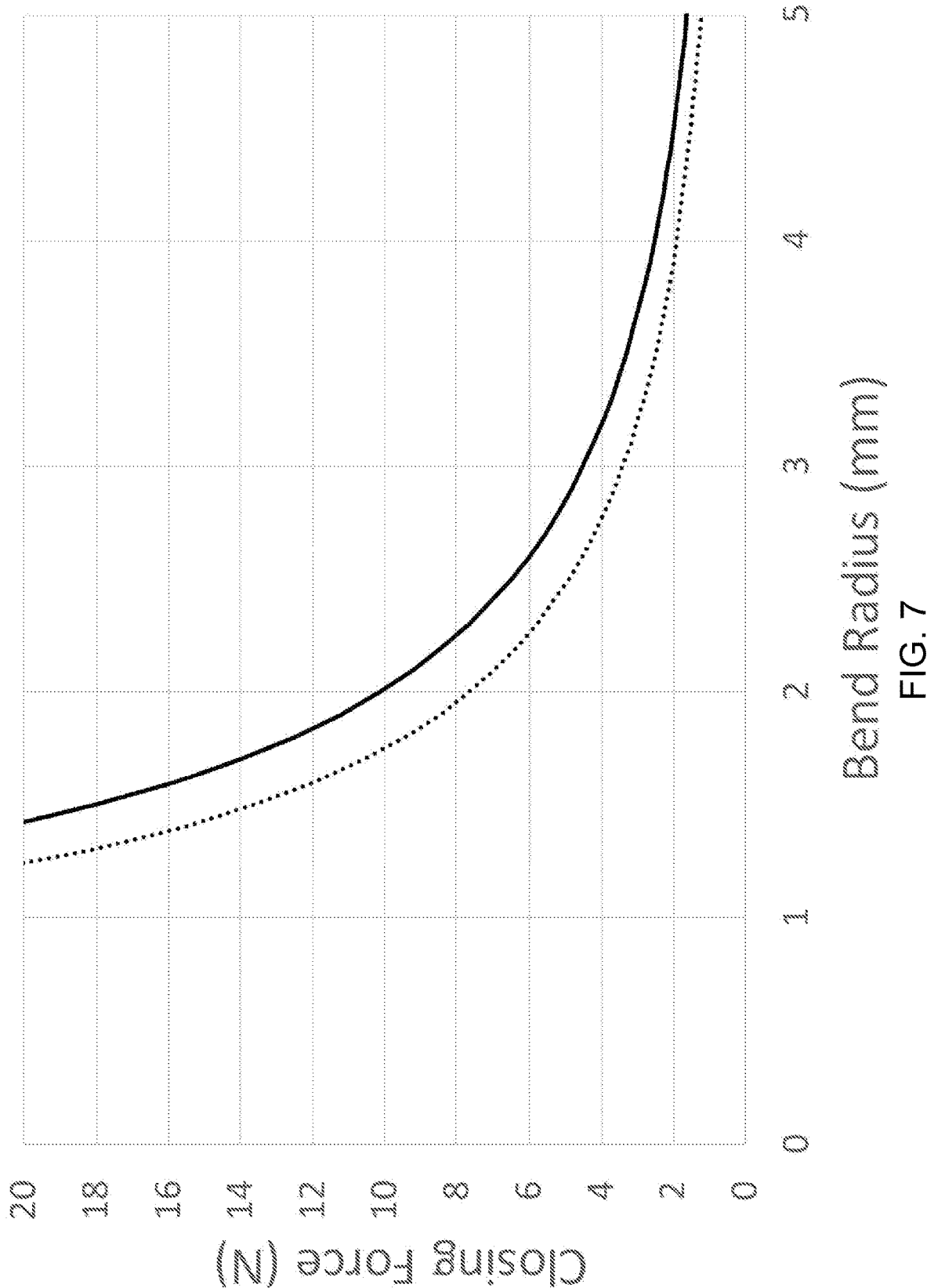
FIG. 7 is a plot of closing force as a function of bend radius for a comparative glass article and a treated glass article according to an embodiment.

The closing force as a function of bend radius for the treated glass composition 6 based article described above with a thickness of 50 μm and sheet width of 100 mm is shown as a dotted line in FIG. 7. The closing force for a comparative ion exchanged alkali aluminosilicate glass with a thickness of 50 μm and sheet width of 100 mm intended for bendable applications is shown as a solid line in FIG. 7. The comparative glass had a base composition including approximately 69 mol % $SiO_2$, 10 mol % $Al_2O_3$, 15 mol % $Na_2O$, and 5.5 mol % MgO. The comparative glass had a bulk Young's modulus of 71.3 GPa and a Poisson's ratio of 0.205, while glass composition 6 has a bulk Young's modulus of 53 GPa and a Poisson's ratio of 0.224. When determining the closing force, the reduced Young's modulus of the surface layer of the treated glass composition 6 based article has a minimal influence and was ignored when calculating the curve shown in FIG. 7.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

What is claimed is:

1. A glass-based article, comprising:
   a reduced Young's modulus layer extending from a surface of the glass-based article to a depth of layer;
   a hydrogen-containing layer extending from the surface of the glass-based article to a hydrogen depth of layer, wherein a hydrogen concentration of the hydrogen-containing layer decreases from a maximum hydrogen concentration to the hydrogen depth of layer; and
   a compressive stress layer from hydrogen species extending from a surface of the glass-based article to a depth of compression,
   wherein:
   the compressive stress layer comprises a compressive stress greater than or equal to 10 MPa, and the reduced Young's modulus layer comprises a Young's modulus at a depth of 500 nm from the surface that is less than a bulk Young's modulus of a glass having a composition equivalent to the composition at the center of the glass-based article; and
   the center of the glass-based article comprises greater than or equal to 10 mol % and less than or equal to 23 mol % $K_2O$ and greater than or equal to 2 mol % and less than or equal to 15 mol % $P_2O_5$.

2. The glass-based article of claim 1, wherein the center of the glass-based article comprises greater than or equal to 55 mol % $SiO_2$.

3. The glass-based article of claim 1, wherein the bulk Young's modulus of a glass having a composition equivalent to the composition at the center of the glass-based article is less than or equal to 60 GPa.

4. The glass-based article of claim 1, wherein the depth of compression is greater than or equal to 5 μm.

5. The glass-based article of claim 1, wherein the depth of compression is greater than or equal to 20 μm.

6. The glass-based article of claim 1, wherein the compressive layer comprises a compressive stress of greater than or equal to 100 MPa.

7. The glass-based article of claim 1, wherein the Young's modulus at a depth of 500 nm from the surface is less than or equal to 95% of the bulk Young's modulus of a glass having a composition equivalent to the composition at the center of the glass-based article.

8. The glass-based article of claim 1, wherein the Young's modulus at a depth of 500 nm from the surface is less than or equal to 90% of the bulk Young's modulus of a glass having a composition equivalent to the composition at the center of the glass-based article.

9. The glass-based article of claim 1, wherein the glass-based article has a thickness of less than or equal to 200 μm.

10. The glass-based article of claim 1, wherein the center of the glass-based article comprises:
    greater than or equal to 55 mol % to less than or equal to 70 mol % $SiO_2$;
    greater than or equal to 3 mol % to less than or equal to 17 mol % $Al_2O_3$;
    greater than or equal to 2 mol % to less than or equal to 10 mol % $P_2O_5$; and
    greater than or equal to 10 mol % to less than or equal to 20 mol % $K_2O$.

11. The glass-based article of claim 1, wherein the center of the glass-based article comprises:
    greater than or equal to 0 mol % to less than or equal to 15 mol % $B_2O_3$;
    greater than or equal to 0 mol % to less than or equal to 10 mol % $Na_2O$;
    greater than or equal to 0 mol % to less than or equal to 5 mol % ZnO; and
    greater than or equal to 0 mol % to less than or equal to 0.5 mol % $SnO_2$.

12. The glass-based article of claim 1, wherein the center of the glass-based article comprises:
    greater than or equal to 0 mol % to less than or equal to 4 mol % $Li_2O$; and
    greater than or equal to 0 mol % to less than or equal to 5 mol % MgO.

13. The glass-based article of claim 1, wherein the glass-based article is substantially free of $Li_2O$ and $Na_2O$.

14. The glass-based article of claim 1, wherein the glass-based article has a stress intensity of less than or equal to 0.4 MPa $\sqrt{m}$ for a bend radius of 3.3 mm, flaw depth of 500 nm, and geometry factor of 0.73.

15. The glass-based article of claim 1, comprising greater than or equal to 10 mol % and less than or equal to 15 mol % $K_2O$.

16. The glass-based article of claim 1, comprising greater than or equal to 2 mol % and less than or equal to 10 mol % $P_2O_5$.

17. A glass-based article, comprising:
a reduced Young's modulus layer extending from a surface of the glass-based article to a depth of layer;
a hydrogen-containing layer extending from the surface of the glass-based article to a hydrogen depth of layer, wherein a hydrogen concentration of the hydrogen-containing layer decreases from a maximum hydrogen concentration to the hydrogen depth of layer; and
a compressive stress layer from hydrogen species extending from a surface of a glass-based article to a depth of compression,
wherein:
the compressive stress layer comprises a compressive stress greater than or equal to 100 MPa; and
the center of the glass-based article comprises greater than or equal to 5 mol % and less than or equal to 23 mol % $K_2O$ and greater than or equal to 2 mol % and less than or equal to 15 mol % $P_2O_5$.

18. The glass-based article of claim 17, wherein the reduced Young's modulus layer comprises a Young's modulus at a depth of 500 nm from the surface that is less than a bulk Young's modulus of a glass having a composition equivalent to the composition at the center of the glass-based article.

19. The glass-based article of claim 17, comprising greater than or equal to 5 mol % and less than or equal to 15 mol % $K_2O$.

20. The glass-based article of claim 17, comprising greater than or equal to 2 mol % and less than or equal to 10 mol % $P_2O_5$.

* * * * *